United States Patent [19]

Wang

[11] Patent Number: 5,630,047
[45] Date of Patent: May 13, 1997

[54] METHOD FOR SOFTWARE ERROR RECOVERY USING CONSISTENT GLOBAL CHECKPOINTS

[75] Inventor: Yi-Min Wang, Berkeley Heights, N.J.

[73] Assignee: Lucent Technologies Inc., Murray Hill, N.J.

[21] Appl. No.: 526,737

[22] Filed: Sep. 12, 1995

[51] Int. Cl.$^6$ .................................................... G06F 11/16
[52] U.S. Cl. ................... 395/182.13; 395/183.1; 395/182.15
[58] Field of Search ............ 395/182.13, 182.11, 395/182.15, 600, 650, 700, 183.1

[56] References Cited

U.S. PATENT DOCUMENTS

| | | | |
|---|---|---|---|
| 4,665,520 | 5/1987 | Strom et al. | 395/182.13 |
| 4,697,266 | 9/1987 | Finley | 395/182.14 |
| 4,740,969 | 4/1988 | Fremont | 395/182.13 |
| 4,852,092 | 7/1989 | Makita | 395/182.15 |
| 5,204,960 | 4/1993 | Smiths et al. | 395/700 |
| 5,235,700 | 8/1993 | Alaiwan et al. | 395/182.11 |
| 5,293,613 | 3/1994 | Hayden et al. | 395/182.13 |
| 5,440,726 | 8/1995 | Fuchs et al. | 395/182.18 |
| 5,481,694 | 1/1996 | Chad et al. | 395/439 |
| 5,528,750 | 6/1996 | Lubart et al. | 395/182.13 |
| 5,530,802 | 6/1996 | Fuchs et al. | 395/182.15 |

OTHER PUBLICATIONS

AA: "Independent Checkpointing and Concurrent Rollback for Recovery in Distributed Systems—An Optimistic Approach", B. Bhargava and S. Lian, *IEEE Symposium on Reliable Distributed Systems*, 1988, pp. 3–12.

"Checkpointing and Rollback–Recovery for Distributed Systems", Richard Koo and Sam Toueg, *IEEE Transactions on Software Engineering*, vol. SE–13, No. 1, Jan. 1987, pp. 23–31.

"Optimistic Recovery in Distributed Systems", R.E. Strom and S. Yemini, *ACM Transactions on Computer Systems*, vol. 3, No. 3, Aug. 1985, pp. 204–226.

"Distributed Snapshots: Determining Global States of Distributed Systems", K. M. Chandy and L. Lamport, *ACM Transactions on Computer Systems*, vol. 3, No. 1, Feb. 1985, pp. 63–75.

"Global Checkpointing for Distributed Programs", Luis M. Silva and J. G. Silva, *Proceedings IEEE Symp. Reliable Distributed Syst.*, 1992, pp. 155–162.

"Efficient Distributed Recovery Using Message Logging", A. P. Sistia and J. L. Welch, *Proc. 8th ACM Symposium on Principles of Distributed Computing*, 1989, pp. 223–238.

(List continued on next page.)

*Primary Examiner*—Robert W. Beausoliel, Jr.
*Assistant Examiner*—Ly V. Hua
*Attorney, Agent, or Firm*—Jeffrey M. Weinick; Donald P. Dinella

[57] ABSTRACT

Disclosed is a method for error recovery in a multiprocessing computer system of the type in which each of the processes periodically takes checkpoints. In the event of a failure, a process can be rolled back to a prior checkpoint, and execution can continue from the checkpointed state. A monitor process monitors the execution of the processes. Upon the occurrence of a failure, a target set of checkpoints is identified, and the maximum consistent global checkpoint, which includes the target set of checkpoints, is computed. Each of the processes is rolled back to an associated checkpoint in the consistent global checkpoint. Upon a subsequent occurrence of the same failure, a second set of checkpoints is identified, and the minimum consistent global checkpoint, which includes the target set of checkpoints, is computed. Each of the processes is rolled back to an associated checkpoint in the consistent global checkpoint. Upon another occurrence of the same failure, the system is rolled back further to a coordinated checkpoint. Also disclosed are novel methods for calculating the minimum and maximum consistent global checkpoints. In accordance with one embodiment, the minimum and maximum consistent global checkpoints are calculated by a central process. In accordance with another embodiment, the minimum and maximum consistent global checkpoints are calculated in a distributed fashion by each of the individual processes.

29 Claims, 19 Drawing Sheets

OTHER PUBLICATIONS

"Checkpointing and Its Applications", Y. Wang, Y. Huang, K. Vo, P. Chung and C. Kintala, *Proc. IEEE Fault Tolerant Computing Symp.* (FTCS–25), Jun. 1995, pp. 22–31.

"Necessary and Sufficient Conditions for Consistent Global Snapshots", R. H. B. Netzer and J. Xu, *IEEE Transactions on Parallel and Distributed Systems*, vol. 6, No. 2, Feb. 1995, pp. 165–169.

"Progressive Retry for Software Error Recovery in Distributed Systems", Y. Wang, Y. Huang and W.K. Fuchs, *Proc. IEEE Fault–Tolerant Computing Symp.*, Jun. 1993, pp. 138–144.

METHOD FOR SOFTWARE ERROR RECOVERY USING CONSISTENT GLOBAL CHECKPOINTS

FIELD OF THE INVENTION

The present invention relates to computer system error recovery in general. More particularly, the present invention relates to computer system error recovery using consistent global checkpoints.

BACKGROUND OF THE INVENTION

A multiprocessing computer system has multiple processes executing on the system. Each process performs a particular task, and the processes, taken as a whole, perform some larger task, called an application. These processes may be executing on a single central computer or they may be running on separate computers which are connected to each other via some type of communication link, i.e. a distributed computer system. As used herein, the term computer includes any device or machine capable of accepting data, applying prescribed processes to the data, and supplying the results of the processes.

In order for the application task to function correctly, the separate processes must coordinate their functions. This coordination is often accomplished through inter-process communication. In a message passing system, inter-process communication is accomplished by processes sending messages to, and receiving messages from, other processes.

If a failure occurs in one of the processes, often the entire application must be reinitialized, because each of the processes is dependent on the successful operation of the other processes. In such a case, each of the processes must be rolled back to the beginning of execution. Such reinitialization is very costly, because all the work performed by the application up until the failure is lost. The cost of restarting a computer system in the event of a process failure is reduced by the technique checkpointing.

A checkpoint is a snapshot of the state of a process which is saved on non-volatile storage, and which survives process failure. Upon recovery, the checkpoint can be reloaded into volatile memory, and the process can resume execution from the checkpointed state. Checkpointing reduces the amount of lost work in the event of a process failure because the checkpointed processes only need to be rolled back to the last checkpoint. When the processes in a system are rolled back to previous checkpoints, the set of checkpoints to which the processes are rolled back is called the recovery line.

In message passing systems, process rollback is complicated by the need to maintain a consistent state of the system. In a message passing system, the rollback of one process may require the rollbacks of other processes in order to guarantee consistency of the state of the system as a whole. For example, if the sender of a message m rolls back to a checkpointed state before message m was sent (i.e. unsends m), then the receiver of m must also roll back to a checkpointed state before m was received (i.e. unreceive m). If such rollback procedure is not followed, the states of the two processes together will show that message m has been received but not yet sent, which is inconsistent.

In a system with N processes, a global checkpoint is a set of N checkpoints, one from each process. A consistent global checkpoint is a global checkpoint which results in a consistent system state. It is noted that a system may have more than one consistent global checkpoint.

SUMMARY OF THE INVENTION

The present invention provides a method for recovering from errors in a multiprocessing computer system. The processes executing in the system are monitored during execution. Upon the detection of an error, a first target set of checkpoints, each from a different process, is identified. This first target set of checkpoints includes checkpoints which are to be included in the recovery line. The system is then rolled back to a maximum consistent global checkpoint containing the first target set of checkpoints. This maximum consistent global checkpoint is the most recent (i.e. closest to time of error occurrence) consistent global checkpoint which includes the first target set of checkpoints, and thus results in the least amount of lost work. This rollback is performed in order to introduce nondeterminism into the system in the hopes of bypassing the error.

If the same error is detected a subsequent time, a second target set of checkpoints is identified and the system is rolled back to a minimum consistent global checkpoint containing the target set of checkpoints. This minimum consistent global checkpoint is the earliest (i.e. furthest from time of error occurrence) consistent global checkpoint which includes the second target set of checkpoints. In this situation, the second target set of checkpoints will generally include checkpoints, beyond which, it is undesirable to rollback past. For example, the execution may include critical execution points which are points in the execution where certain critical events or critical processing takes place. A rollback past such a critical execution point may be undesirable. This rollback is performed in order to introduce as much nondeterminism into the system as possible, without rolling back past critical execution points.

If the same error occurs another time, then the system is further rolled back to a recovery line which will guarantees a consistent system state (e.g. a coordinated checkpoint or the beginning of program execution).

In accordance with another aspect of the invention, novel techniques are provided for determining the minimum and maximum consistent global checkpoints. In one embodiment of the invention, the minimum and maximum consistent global checkpoints are determined in a centralized manner by a central process. In accordance with this embodiment, the central process requests dependency information from the individual processes, and uses this information to create a rollback dependency graph, which represents the checkpoint and communication pattern of the system. The central process then performs a novel reachability search on the rollback dependency graph in order to determine the maximum or minimum consistent global checkpoint containing the target set of checkpoints.

In another embodiment, the minimum and maximum consistent global checkpoints are determined in a distributed manner, by each of the individual processes. In this embodiment, each of the processes in the system locally maintains dependency information representing the portion of the checkpoint and communication pattern which affects the state of that process. Upon receipt of an action request, which includes a target set of checkpoints, each of the processes uses its locally maintained dependency information to determine the checkpoint which the process contributes to the maximum or minimum consistent global checkpoint.

These and other advantages of the invention will be apparent to those of ordinary skill in the art by reference to the following detailed description and the accompanying drawings.

3

DETAILED DESCRIPTION

Figure 1:
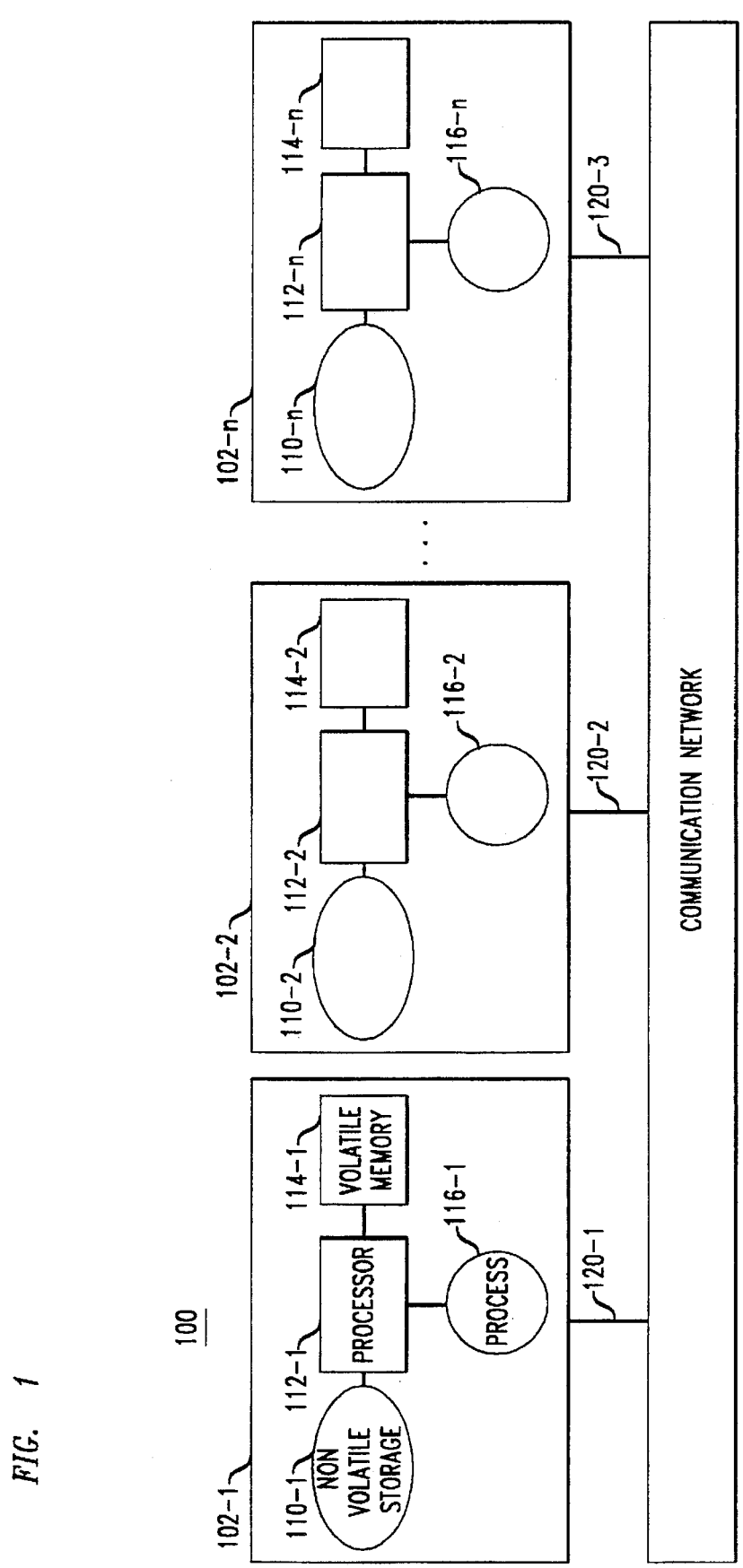
FIG. 1 shows a distributed message passing computer system.

FIG. 1 shows a distributed message passing computer system 100. The system comprises computers 102, each of which may be of the type well known in the art, for example a mainframe computer, a minicomputer, or a personal computer. Each of the computers 102-1, 102-2, 102-n, contains a processor 112 for executing processes 116-1, 116-2, 116-n respectively. The processes 116 cooperate with each other to perform an overall function, which is the application of the system 100. Such cooperation is effected through inter-process communication over communication links 120-1, 120-2, 112-n and communication network 130. Each process is capable of sending messages to, and receiving messages from, other processes. It is to be noted that although each of the processors 112 is shown executing a single process, each processor may execute multiple processes.

At each point in time during execution, a process has a state, which defines the process at that time. For example, the state of a process may include the program counter, stack pointer, program variables, and program stack. During execution the state of a process is continuously changing. The state of an executing process may be stored in processor 112, volatile memory 114, or a combination of both. When the state of a process is stored in volatile memory 114 or in the processor 112 it is called a volatile state. In the event of process failure, the volatile state of a failed process is lost.

In order to reduce the amount of lost work in the event of a failure, processes 116 may take checkpoints of their current states and store the state on a non-volatile storage device 110. When such a checkpoint is taken, the stored state is called a checkpointed state, and in the event of a process failure, a previously stored checkpointed state can be retrieved from non-volatile storage 110. The failed process may be restored to the retrieved checkpointed state and execution may progress from this state. Such a process is called a rollback. In order to maintain a consistent system state, non-failed processes may also need to rollback to a previously checkpointed state. Checkpointing and rollback are techniques which are well known in the art. See, R. Koo and S. Touge, "Checkpointing and Rollback-Recovery for Distributed Systems", *IEEE Trans. Software Eng.*, SE-13(1): 23–31, Jan. 1987; R. E. Strom and S. Yemini, "Optimistic Recovery in Distributed Systems", *ACM Trans. Comput. Syst.*, 3(3):204–226, Aug. 1985; and Y. M. Wang, Y. Huang, K. P. Vo, P. Y. Chung, and C. Kintala, "Checkpointing and its Applications", *Proc. IEEE Fault-Tolerant Computing Symp.*, pages 22–31, Jun. 1995; which are incorporated herein by reference.

1. Notation

The checkpointing and message passing of processes in a multiprocess system will be described in further detail with reference to FIG. 2, which shows an example checkpoint and communication pattern of a multiprocess computer system executing three processes $P_0$, $P_1$, and $P_2$. The execution of each of the processes over time is represented by a horizontal execution line, with the time frame moving forward from left to right. Thus, given any two points on an execution line, the point to the left occurs before the point to the right. The execution of process $P_0$ is represented by line 20, the execution of process $P_1$ is represented by line 22, and the execution of process $P_2$ is represented by line 24. Each solid rectangle represents a non-volatile checkpoint and each triangle represents a volatile checkpoint. A non-volatile checkpoint is one which is stored on a non-volatile storage device, such as a disk drive, which will survive a process failure. A volatile checkpoint is the state of a process at a particular instant. The state is available during normal process execution, but if the process fails, the volatile checkpoint is lost.

With respect to checkpoint notation, $C_{i,x}$ denotes a checkpoint of process $P_i$ where i is the process identification and x is the checkpoint index. Note that the checkpoint index starts counting from 0 so that the checkpoint index of an initial checkpoint is 0. For example, the initial checkpoint of process $P_0$ is denoted as $C_{0,0}$ and is shown in FIG. 2 at 28. It is noted that an initial checkpoint, e.g. checkpoint $C_{0,0}$ 28 may also represent the beginning of process execution. With respect to time interval notation, $I_{i,x}$ denotes the checkpoint interval between checkpoints $C_{i,x}$ and $C_{i,x+1}$. Thus, as shown in FIG. 2, the checkpoint interval between checkpoints $C_{0,0}$ and $C_{0,1}$ is denoted $I_{0,1}$.

Figure 2:
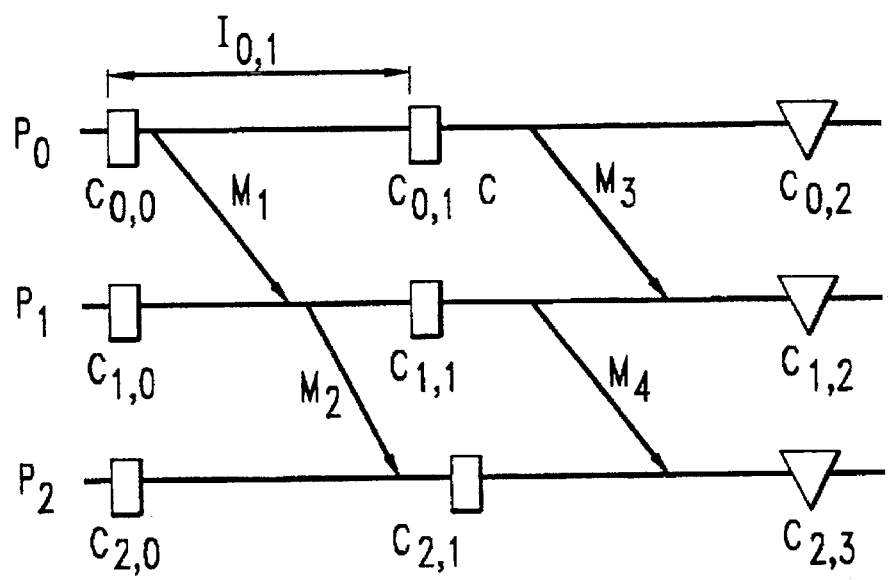
FIG. 2 shows an example checkpoint and communication pattern.

In addition to representing checkpoints, the checkpoint and communication pattern of FIG. 2 also represents communications between processes. A directed line from the execution line of one process to the execution line of another process indicates that a message m is passed from one process to another. For example, line 26 represents message $m_1$ being sent from process $P_0$ to process $P_1$. Message $m_1$ is sent during checkpoint interval $I_{0,1}$ and is received during checkpoint interval $I_{1,1}$.

The checkpoint and communication pattern shown in FIG. 2 can be used to further explain what is meant by a global checkpoint and a consistent global checkpoint. As stated above, a global checkpoint is a set of N checkpoints, one from each process. Thus, in the system illustrated in FIG. 2, a global checkpoint would consist of 3 checkpoints, one each from processes $P_0$, $P_1$, and $P_2$. A consistent global checkpoint is a global checkpoint which results in a consistent system state. For example, suppose it were necessary to rollback process $P_0$ from $C_{0,2}$ to $C_{0,1}$. Such a rollback would unsend message $m_3$. If only process $P_0$ were rolled back, then the states of processes $P_0$ and $P_1$ taken together would indicate that message $m_3$ was never sent, but it was received by process $P_1$. Since this is an inconsistent system state, it is necessary to rollback process $P_1$ from $C_{1,2}$ to $C_{1,1}$ in order to unreceive message $m_3$. However, such a rollback would unsend message $m_4$. AS a result, it is necessary to unreceive message $m_4$ by rolling back process $P_2$ from $C_{2,3}$ to $C_{2,1}$. Thus, the most recent (i.e. closest to the time of the error) consistent global checkpoint which could be used by the system in response to $P_0$'s initially required rollback would include checkpoints $\{c_{0,1}, c_{1,1}, c_{2,1}\}$. A set of checkpoints which is used to recover from a process failure is called a recovery line.

Figure 3:
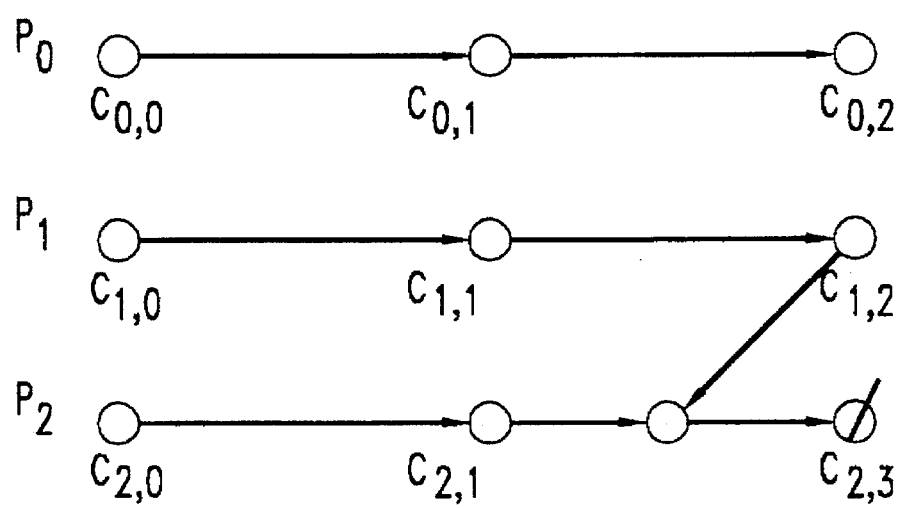
FIG. 3 shows the rollback dependency graph for the checkpoint and communication pattern of FIG. 2.

The checkpoint and communication pattern of a multi-process computer system, such as shown in FIG. 2, can be represented by a rollback dependency graph. A rollback dependency graph representation of a checkpointing and communication pattern can be stored in a computer and can be operated on by a computer process, as is well known in the art. See, B. Bhargava and S. R. Lian, "Independent Checkpointing and Concurrent Rollback for Recovery—An Optimistic Approach", in *Proc. IEEE Symp. Reliable Distributed Syst.*, pages 3–12, 1988, which is incorporated herein by reference. The rollback dependency graph for the checkpoint and communication pattern of FIG. 2 is shown in FIG. 3. In a rollback dependency graph each node represents a checkpoint and a directed edge is drawn from the node representing checkpoint $C_{i,x}$ to the node representing checkpoint $C_{j,y}$ if either:

1) i≠j and a message m is sent from checkpoint interval $I_{i,x}$ and received in checkpoint interval $I_{j,y}$; or
2) i=j and y=x+1.

Figure 5A:
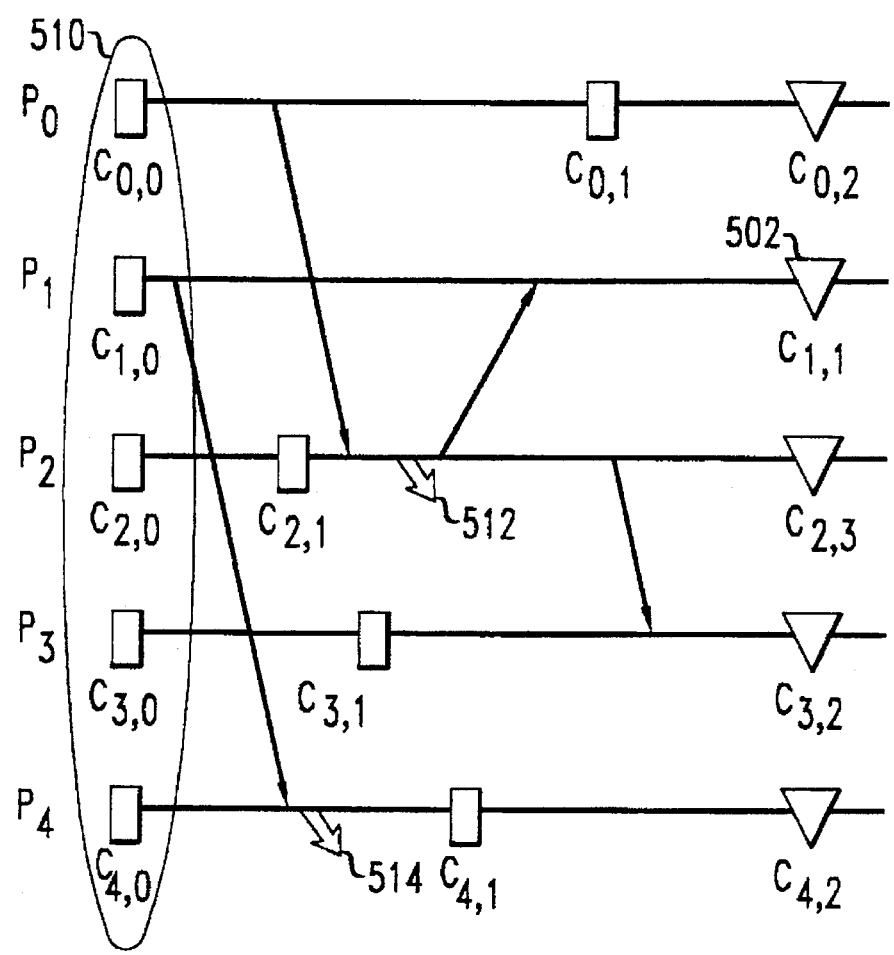
FIG. 5A. shows an example checkpoint and communication pattern of a multiprocess computer system.
Figure 5B:
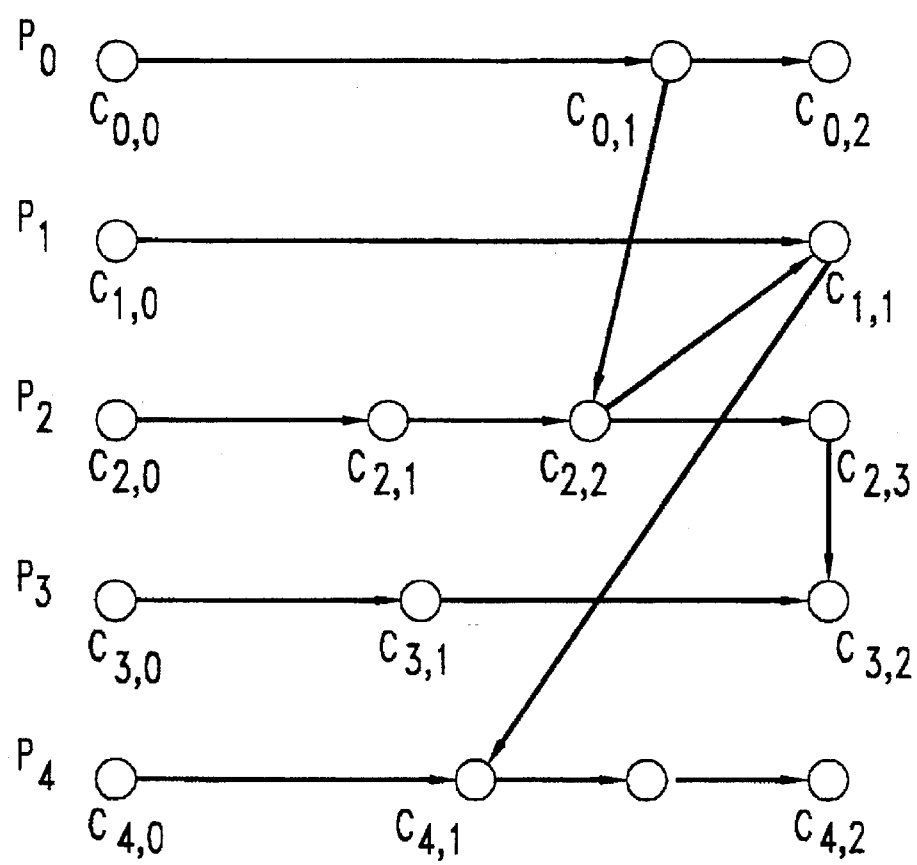
FIG. 5B shows the rollback dependency graph for the checkpoint and communication pattern of FIG. 5A.

As shown in the rollback dependency graphs of FIG. 3 and FIG. 5B, circular nodes represent non-volatile checkpoints and oval nodes represent volatile checkpoints. As used herein, capital C is used to represent checkpoints, and lower case c is used to represent nodes in a rollback dependency graph. When reference is made to a node $c_{x,y}$ in the rollback dependency graph, reference is being made to the node which represents the checkpoint $C_{x,y}$.

2. Software Error Recovery 2.1 Overview

Software errors in large systems are often due to nondeterministic events, and as a result, such errors am transient. For example, a particular process starting from a first state may encounter a nondeterministic event which results in an error. If that process is rolled back to the first state, it may not encounter the nondeterministic event, or the nondeterministic event may behave in a different way, and therefore the error may not occur (i.e. the error is bypassed). For example, such nondeterminism may be present with respect to messages coming from different communications channels. Such messages may arrive in different orders during different execution of the same process.

Consider the checkpoint and communication pattern shown in FIG. 5A, with the associated rollback dependency graph shown in FIG. 5B. Suppose a software error is detected at point 502, which error is caused by an unexpected nondeterministic event. A diagnosis procedure may examine the error symptom and determine that the system should roll back to a recovery line including checkpoints $C_{0,1}$ and $C_{2,2}$. One such diagnosis procedure may look for a checkpoint which is likely not to be corrupted. For example, the diagnosis procedure may base its determination on error detection latency. See, L. M. Silva and J. G. Silva, "Global Checkpointing for Distributed Programs", *Proc. IEEE Symp. Reliable Distributed Syst.*, pages 155–162, 1992, which is incorporated by reference herein. The details of such diagnosis procedures are not important for the purposes of describing the present invention.

Thus, assume that the diagnosis procedure determined that the system should roll back to a recovery line including checkpoints $C_{0,1}$ and $C_{2,2}$. In order that the least amount of work will be lost, it is desirable to rollback as little as possible. Thus, it is desired to find the most recent (i.e. closest to time of error) consistent global checkpoint, which includes the checkpoints $C_{0,1}$ and $C_{2,2}$. Such a checkpoint is called a maximum consistent global checkpoint. The given set of checkpoints which are to be included in the consistent global checkpoint ($C_{0,1}$ and $C_{2,2}$ in this example) is called the target set of checkpoints. A detailed description of the determination of the maximum consistent global checkpoint, given a target set of checkpoints, will be discussed in further detail below.

The maximum consistent global checkpoint, given $C_{0,1}$ and $C_{2,2}$ as the target set of checkpoints, includes the checkpoints $\{C_{0,1}, C_{1,1}, C_{2,2}, C_{3,1}, C_{4,2}\}$. Thus, upon failure of process $P_2$ at point 502, the system should be rolled back to checkpoints $\{C_{0,1}, C_{1,1}, C_{2,2}, C_{3,1}, C_{4,2}\}$. If the continued execution of the system results in the same error at point 502 after the rollback, then a more expensive rollback is required because the rollback to the maximum consistent global checkpoint did not introduce enough nondeterminism to bypass the bug. One choice for a more expensive rollback is to rollback to an initial coordinated checkpoint, represented in FIG. 5A as 510 and containing the checkpoints $\{C_{0,0}, C_{1,0}, C_{2,0}, C_{3,0}, C_{4,0}\}$. A rollback to an initial coordinated checkpoint assures a consistent system state because such checkpoints are coordinated. Coordinated checkpoints will be discussed in further detail below. However, in certain circumstances, such a rollback is undesirable because it may involve rolling back past some critical point in system execution. A critical point is at, execution point at which some critical event or critical processing takes place. For example, in FIG. 5A, arrows 512 and 514 represent system outputs. System outputs may be, for example, printouts sent to a printer, cash dispensed from a money machine, setting a telecommunications switch, etc. It is difficult to rollback past such a point and to revoke such an output, and such points are called output commit points. Because of the undesirable effects associated with such a rollback, a rollback which does not revoke any output should be tried first, before resorting to a rollback which will require revocation of output. For example, as shown in FIG. 5A, it may be desirable to roll back as far as possible, i.e., as close to the initial coordinated checkpoints 510 as possible, in order to allow more nondeterminism to bypass the bug; but at the same time, the recovery should not rollback past the two output points 512 and 514. Thus, it is desirable to rollback as far as possible but not past checkpoint $C_{2,2}$ for process $P_2$, and checkpoint $C_{4,1}$ for process $P_4$.

Given a target set of checkpoints, the consistent global checkpoint which includes the target set of checkpoints and which rolls back as far as possible from the point of error, is called the minimum consistent global checkpoint. Thus, in the example shown in FIG. 5A, it is desirable to find the minimum consistent global checkpoint containing the checkpoints $C_{2,2}$ and $C_{4,1}$. This minimum consistent global checkpoint contains the checkpoints $\{C_{0,1}, C_{1,1}, C_{2,2}, C_{3,0}, C_{4,1}\}$.

If, upon continued execution of the system after the rollback, the error at point 502 occurs again, then a further rollback to the initial coordinated checkpoints 510 $\{C_{0,0}, C_{1,0}, C_{2,0}, C_{3,0}, C_{4,0}\}$ is considered.

2.2 Detailed Description of Software Error Recovery Using Minimum and Maximum Consistent Global Checkpoints Two embodiments of the invention are discussed below. The first embodiment is the centralized embodiment, in which the maximum and minimum consistent global checkpoints are determined in a centralized manner by a single process. The second embodiment is the distributed embodiment, in which the maximum and minimum consistent global checkpoints are determined in a distributed manner by each of the individual processes.

2.2.1 Centralized Determination

2.2.1.2 Message Processing

Figure 4:
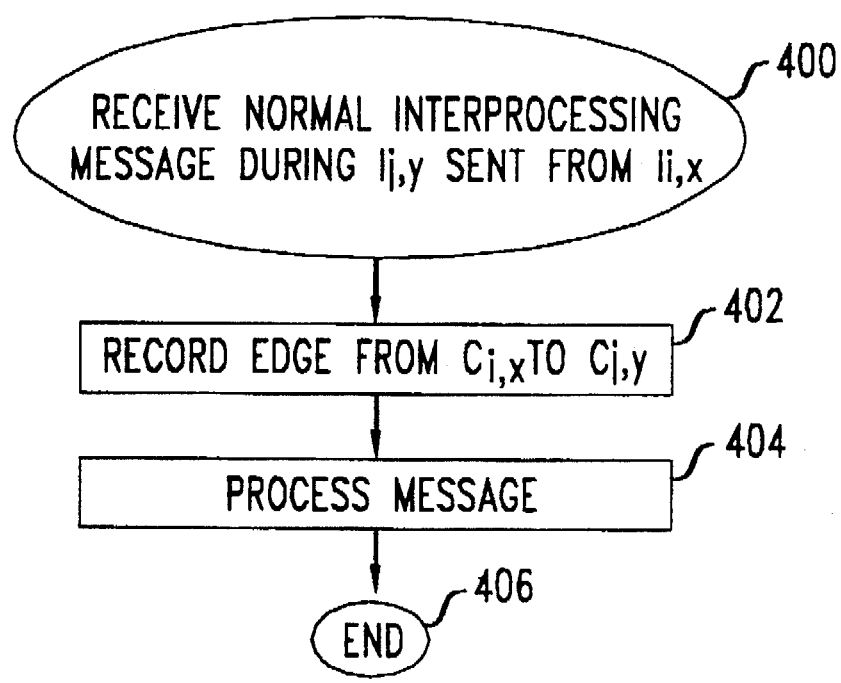
FIG. 4 shows a flowchart of the processing of a normal inter-process message in accordance with a centralized embodiment of the invention.

As will be discussed in further detail below, in the centralized embodiment of the invention, a rollback dependency graph is used to determine the desired checkpoints in the event of a process failure. In order to construct the rollback dependency graph, certain information is typically employed. In one embodiment, this information is saved by the processes during message processing as illustrated by the flowchart of FIG. 4. It is assumed that when a process receives a message, it knows from which process the message was sent and during which checkpoint interval the message was sent. This information may be included, for example, in the header of the message.

In step 400, a process $P_j$ receives a normal inter-process message during checkpoint interval $I_{j,y}$ which message was sent by process $P_i$ during checkpoint interval $I_{i,x}$. In step 402, process $P_j$ records in volatile memory an indication that a rollback dependency graph edge exists from node $c_{i,x}$ to node $c_{j,y}$ in the rollback dependency graph. In step 404, process $P_j$ processes the received message. Such processing would vary depending upon the application of the computer system, and the details of such processing is not important for the description of the present invention. The processing of the received message ends in step 406.

2.2.1.3 Checkpointing

During execution of the processes in the system, the processes will periodically take checkpoints. There are two types of checkpoints: coordinated checkpoints and uncoordinated checkpoints. During a coordinated checkpoint, each of the processes are coordinated to take a checkpoint at essentially the same time. As a result, a set of coordinated checkpoints always defines a consistent global checkpoint, and a rollback to a coordinated checkpoint yields a consistent system state. Coordinated checkpoints are discussed in further detail in, K. M. Chandy and L. Lamport, "Distributed Snapshots: Determining Global States of Distributed Systems", ACM Trans. Comput. Syst., 3(1):63–75, Feb. 1985.

In addition to coordinated checkpoints, each process may periodically take an uncoordinated checkpoint. Such a checkpoint is not coordinated with other processes, and each process determines when it will take such a checkpoint, independent of the other processes. Unless otherwise indicated, when reference is made herein to a checkpoint, it is assumed that reference is being made to an uncoordinated checkpoint.

In the case of either a coordinated checkpoint or an uncoordinated checkpoint, the checkpointing procedure for a process is as follows. Upon taking a checkpoint, current state information for a process is saved on a non-volatile storage device. As discussed above, such state information may include the program counter, stack pointer, program variables, and program stack. An identification of the checkpoint is also saved (e.g. the checkpoint index). The rollback dependency graph edge information which is recorded during message processing, as described above in conjunction with step 402 of FIG. 4, is also saved.

In one embodiment, the above checkpoint information is saved on a process's local non-volatile storage device. Thus, in the example system shown in FIG. 1, process 116-1 checkpoint information is stored on non-volatile storage device 110-1; process 116-2 checkpoint information is stored on non-volatile storage device 110-2; and process 116-n checkpoint information is stored on non-volatile storage device 116-n.

In an alternate embodiment, each process saves the above checkpoint information on a central non-volatile storage device (not shown) which is shared by all processes in the system.

2.2.1.4 Watchdog Process

Figure 6A:
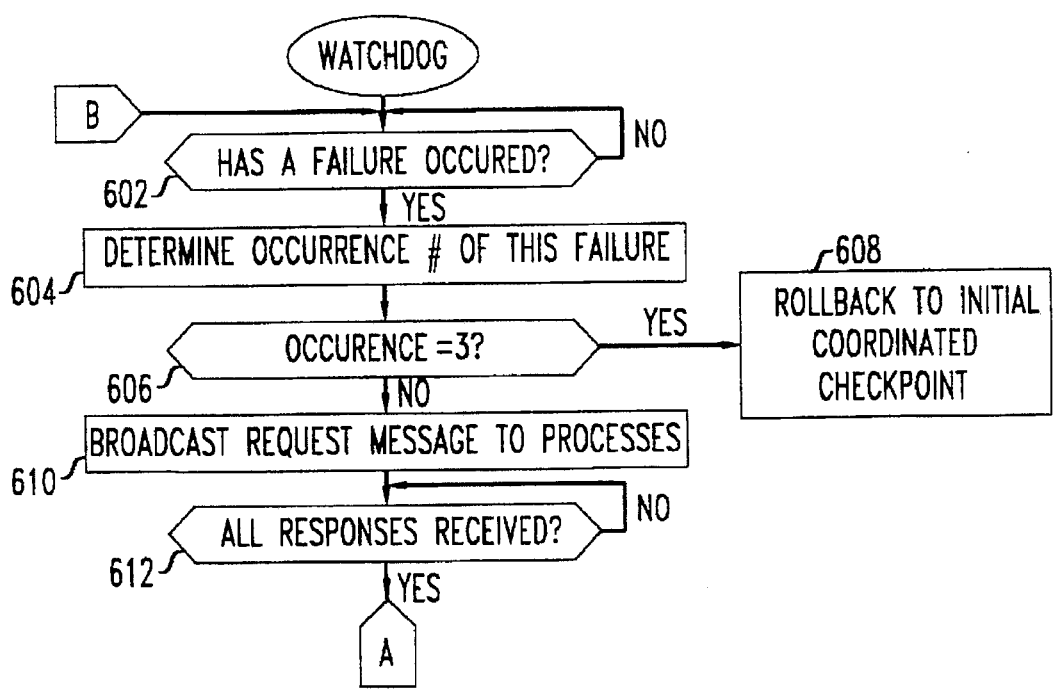
FIGS. 6A and 6B show a flowchart of the functioning of the watchdog process in accordance with a centralized embodiment of the invention.

In the centralized embodiment of the invention, error recovery and the determination of the minimum and maximum consistent global checkpoint is handled by a central process. That is, a single monitoring process, called a watchdog process, monitors the system for failures. Upon detection of a failure, the watchdog process determines the appropriate recovery line, and communicates this recovery line to the individual processes. The functioning of the watchdog process is described in conjunction with the flow diagram of FIGS. 6A and 6B. In one embodiment of the invention, the watchdog process executes on one of the processors 116 of the computer system 100, and monitors the other processes executing on the system. One appropriate technique for implementing the monitoring function of the watchdog process is disclosed in copending U.S. patent application Ser. No. 08/301,362, entitled Apparatus and Methods For Fault-Tolerant Computing, filed Sep. 6, 1994 (Docket No. Huang 7). It is noted that in an alternate embodiment, the process that monitors the processes for failures may be separate from the process that determines the minimum and maximum consistent global checkpoints. In such an embodiment, the monitor process would notify another process when a failure occurs, and the other process would handle the determination of the minimum and maximum consistent global checkpoints. In the central embodiment described herein, the watchdog process handles both the monitoring function and the determination of the minimum and maximum consistent global checkpoints.

The watchdog process continuously executes in one of the processors 112 of system 100. In step 602, the watchdog process determines if a failure of one of the processes has occurred. If not, then the watchdog continues monitoring the processes of the system 100. Upon detection of a failure, control passes to step 604, in which the watchdog process determines the occurrence number of this failure (i.e. how many times the same error has occurred). The determination as to when an error is "the same" as a prior error may be made on an application specific basis. One way for determining whether a subsequent error is "the same" as a prior error is to base the determination on the time period between the errors. For example, if a second error occurs within 10 minutes of a first error, the second error may be considered "the same" as the first error. As discussed above, during software error recovery, rollback processing is different depending upon how many times the same error has occurred. In step 606 it is determined whether this is the third occurrence of the failure. If not, then control passes to step 610 where the watchdog process broadcasts a request message to all of the processes executing in the system. This message includes a request for:

1) rollback dependency graph information;
2) local error diagnosis information: and
3) output commit information.

The rollback dependency graph information is the graph edge information recorded by each of the processes, as discussed above in conjunction with step 402 of FIG. 4. This information is requested by the watchdog process so that it can process the data and construct data that represents a rollback dependency graph. The local error diagnosis information indicates, for example, which of the process's checkpoints may be corrupted, and therefore, should not be included in the target set. The output commit information is an indication of whether the process has any output commit points, such as points 512 and 514 (FIG. 5A), beyond which a rollback is undesirable.

Figure 11:
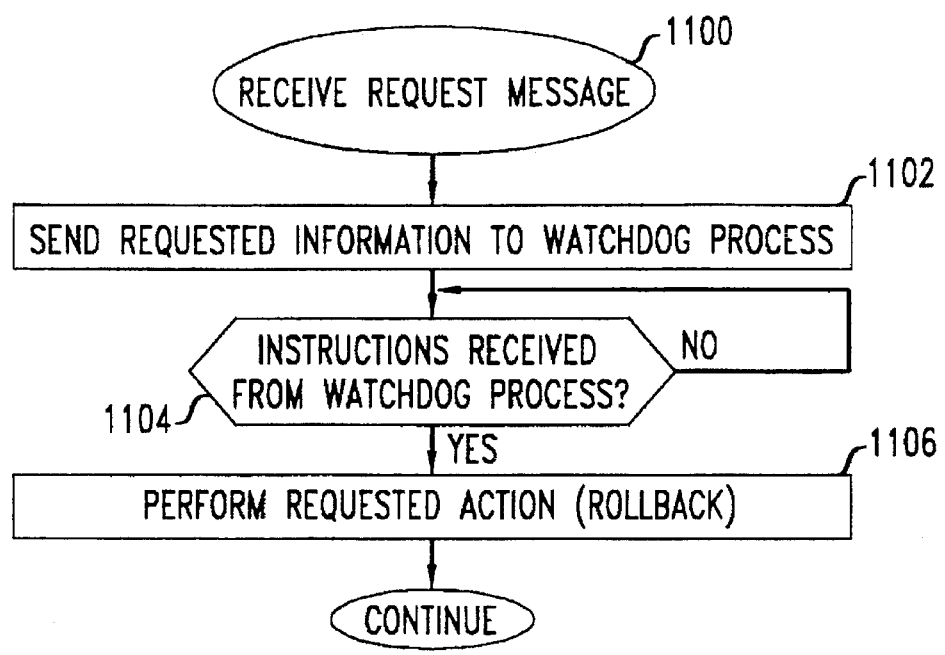
FIG. 11 shows a flowchart illustrating the processing of a request message by a process in accordance with a centralized embodiment of the invention.

After sending request messages to the processes, the watchdog process waits at step 612 until all responses are received. The processing of a request message by a process, is shown in the flowchart of FIG. 11. In step 1100, the process receives the request message. In step 1102, the process sends the requested information to the watchdog process. The process then waits for instructions from the watchdog process in step 1104.

The above processing takes place in the embodiment in which the checkpoint information is stored by each process on a local non-volatile storage device. In such an embodiment, the watchdog process needs to request this information from the processes because the local non-volatile storage devices are not directly available to the watchdog process. As discussed above, in an alternate embodiment, process checkpoint information is stored on a shared non-volatile storage device, which is accessible to the watchdog process. In such an embodiment, the watchdog process does not need to request the rollback dependency graph information from the processes because the information is available to the watchdog process through the shared non-volatile storage device. However, the watchdog process must still request the local error diagnosis information and output commit information from the processes.

Figure 6B:
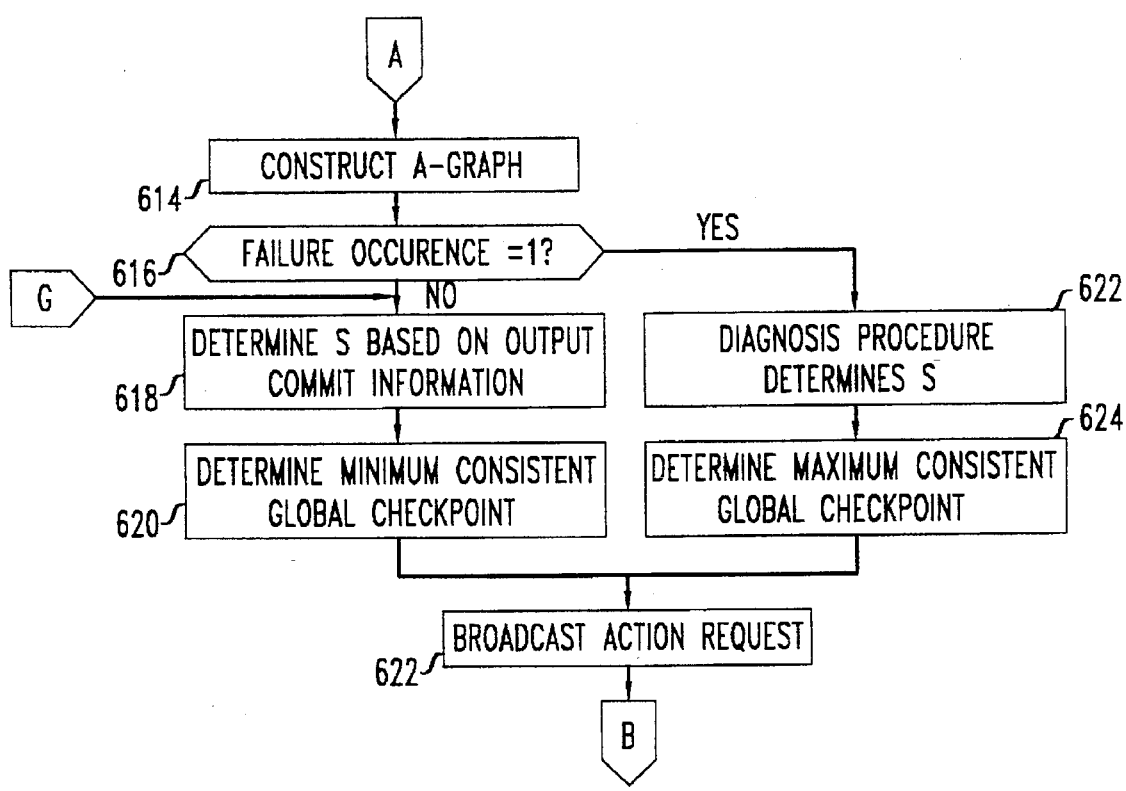

Returning now to the functioning of the watchdog process, upon receipt of all responses, the watchdog process constructs the rollback dependency graph in step 614 (FIG. 6B). As used herein, when reference is made to the construction or creation of a rollback dependency graph, it is to be understood that what is constructed is a data structure which represents the rollback dependency graph. This data structure is stored in computer memory, and is accessed when rollback dependency graph information is needed. Thus, assuming the checkpoint and communication pattern shown in FIG. 5A, the watchdog process would construct the rollback dependency graph shown in FIG. 5B. The rollback dependency graph is constructed according to the rules described above in conjunction with FIGS. 2 and 3. The construction of a rollback dependency graph from checkpoint and communication pattern information, and the storage of a data structure in computer memory which represents the rollback dependency graph is well known in the art. See, B. Bhargava and S. R. Lian, "Independent Checkpointing and Concurrent Rollback for Recovery—An Optimistic Approach", in Proceeding of *IEEE Symposium on Reliable Distributed Systems*, pages 3–12, 1988. After the watchdog process constructs the rollback dependency graph data, and stores it in memory, control passes to step 616 in which it is determined whether this is the first occurrence of this particular failure. If it is, then in step 622 a diagnosis procedure is invoked in order to determine the target set of checkpoints (denoted as S). Depending upon the type of error, it is desirable to identify a target set of checkpoints which, if included in the recovery line, will increase the chances of bypassing the error. One such diagnosis procedure which may be used for determining a target set of checkpoints is discussed in, L. M. Silva and J. G. Silva, "Global Checkpointing for Distributed Programs", *Proc. IEEE Symp. Reliable Distributed Syst.*, pages 155–162, 1992.

Upon determination of a target set of checkpoints, the maximum consistent global checkpoint containing the target set of checkpoints is determined in step 624. As discussed above in the software error recovery overview, upon the first occurrence of a failure, it is desirable to rollback the processes as little as possible, so that the least amount of processing is lost. Thus, given the target set of checkpoints as a constraint, it is desirable to find the maximum consistent global checkpoint including the target set of checkpoints. The determination of the maximum consistent global checkpoint is described in conjunction with the flow diagram of FIG. 7, and the rollback dependency graph of FIG. 8 (which is the same rollback dependency graph as shown in FIG. 5B, which is constructed from the checkpoint and communication pattern of FIG. 5A.)

Figure 7:
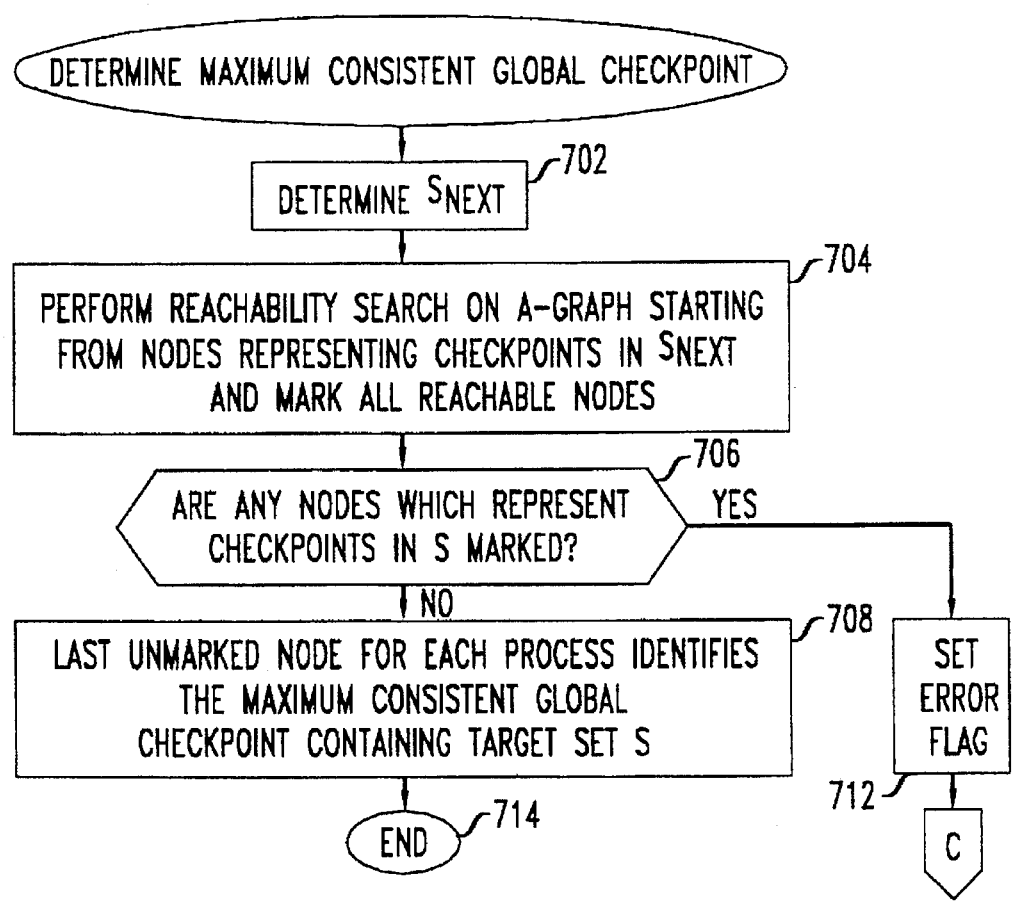
FIG. 7 shows a flowchart illustrating the determination of the maximum consistent global checkpoint in accordance with a centralized embodiment of the invention.

Referring to FIG. 7, the first step 702, is to determine $S_{next}$. Given a target set of checkpoints S, $S_{next}$ is defined as:

$$S_{next} = \{C_{i,x+1} : C_{i,x} \in S \text{ such that } C_{i,x} \text{ is nonvolatile}\} \text{(it is noted that the size of } S_{next} \text{ may be smaller than the size of S)}.$$

Thus, set $S_{next}$ contains the checkpoints (volatile or nonvolatile) for each process (if they exist) that follow the checkpoints in the set S. In the example rollback dependency graph shown in FIG. 8, assume the target set of checkpoints S contains the checkpoints $C_{0,1}$ and $C_{2,2}$. In this example, the set $S_{next}$ contains the checkpoints $\{C_{0,2}, C_{2,3}\}$.

Figure 8:
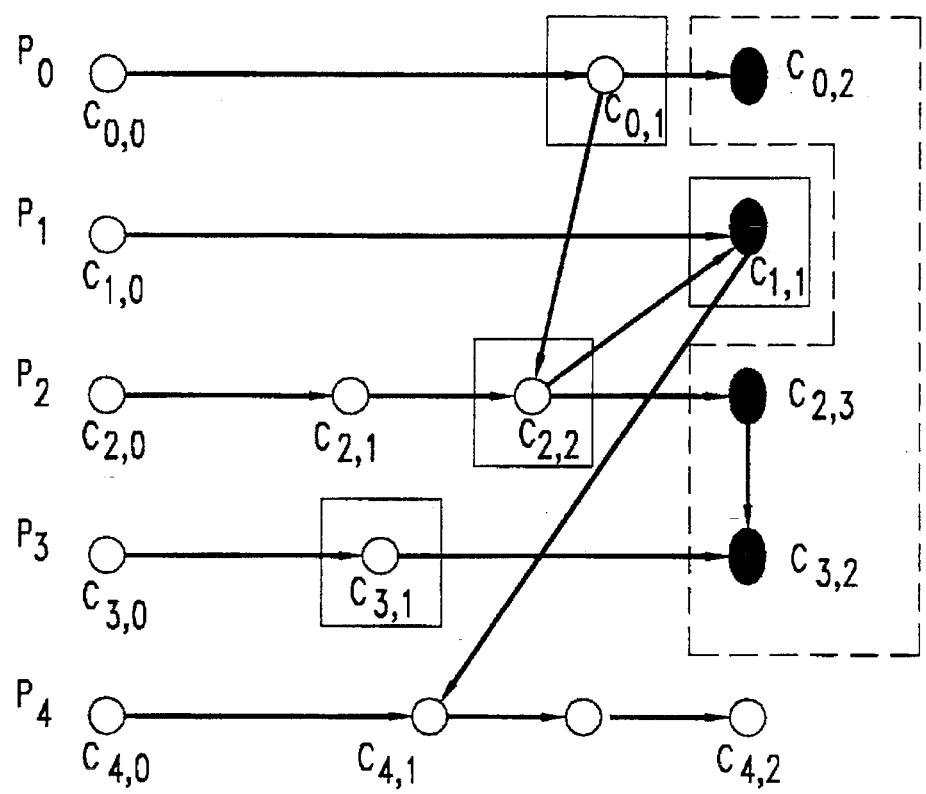
FIG. 8 shows the rollback dependency graph for the checkpoint and communication pattern of FIG. 5A.

In step 704 a reachability search is performed on the rollback dependency graph starting from each of the nodes representing the checkpoints in the set $S_{next}$, and each of the reachable nodes is marked. A node is reachable if it can be reached by following the directed edges of the rollback dependency graph. A node is reachable if it is reachable from a starting node and if it is reachable from any other reachable node. Reachability searches on rollback dependency graphs, and the implementation of such searches utilizing rollback dependency graph information stored in a computer memory, are well known in the art. See, See, B. Bhargava and S. R. Lian, "Independent Checkpointing and Concurrent Rollback for Recovery—An Optimistic Approach", in *Proc. IEEE Symp. Reliable Distributed Syst.*, pages 3–12, 1988. Thus, in FIG. 8, the reachability search is started from nodes $c_{0,2}$ and $c_{2,3}$. These starting nodes are marked, since each of the starting nodes is reachable from itself. Following the directed edges from each of the starting nodes, it is determined that nodes $\{c_{0,2}, c_{2,3}, c_{3,2}\}$ are reachable. These reachable nodes are marked in the rollback dependency graph, as shown in FIG. 8. As noted above, the watchdog process stores data representing the rollback dependency graph in memory. Depending upon how this data is stored, the watchdog process will "mark" the data as appropriate. For example, the watchdog process may add some indication to the data to indicate reachable nodes, or it may keep a list of reachable nodes. Thus, as used herein, the term "marked" is used to indicate any technique used by the watchdog process to indicate that a node is reachable.

In step 706 it is determined whether any nodes, which represent checkpoints in S are marked. In this example, the set S contains checkpoints $\{C_{0,1}, C_{2,2}\}$. Since neither of the nodes $c_{0,1}$ nor $c_{2,2}$ were marked, the test in step 706 is "no" and control passes to step 708. In step 708 the maximum consistent global checkpoint is identified by selecting the last (i.e. most recent) unmarked node for each process in the rollback dependency graph. Thus, in this example, the last unmarked node for each of the processes consists of the set of nodes $\{c_{0,1}, c_{1,1}, c_{2,2}, c_{3,1}, c_{4,2}\}$. Thus, the maximum consistent global checkpoint contains the checkpoints associated with these marked nodes, specifically checkpoints $\{C_{0,1}, C_{1,1}, C_{2,2}, C_{3,1}, C_{4,2}\}$. The determination ends in step 714, and control returns to step 626. The continued execution from step 626 will be discussed in further detail below. It is noted that step 708 will always return a maximum consistent global checkpoint, because if step 708 is reached, at least the initial coordinated checkpoints $\{C_{0,0}, C_{1,0}, C_{2,0}, C_{3,0}, C_{4,0}\}$ will not be marked.

If it were determined in step 706 that one or more nodes which represent checkpoints in the target set of checkpoints S were marked, then an error flag is set in step 712. The error flag is set because this condition indicates that there is no consistent global checkpoint including the checkpoints in the target set S. Control then passes to step 622 again, in which the diagnosis procedure is invoked in order to determine the target set of checkpoints. Since the error flag was set in step 712, the diagnosis procedure recognizes the error condition and will determine a new target set of checkpoints in order to bypass the error condition. The determination of a new target set of checkpoints by the diagnosis procedure and the attempt to determine a maximum consistent global checkpoint based on that target set will continue until a maximum consistent global checkpoint is found. If a coordinated checkpoint exists, then a maximum consistent global checkpoint can always be found to include the checkpoints which make up the coordinated checkpoint.

If it was determined in step 616 that the failure occurrence was not 1, then control passes to step 618. Note that step 618 is reached if the failure occurrence is 2. If this is the case, then the same failure has occurred two times. The first time, the system rolled back to a maximum consistent global checkpoint in accordance with steps 622, 624, and 626. Thus, if control reaches step 618, in accordance with the recovery processing of the present invention, the system will attempt to rollback to a minimum consistent global checkpoint. In step 618, the target set of checkpoints S to be included in the minimum consistent global checkpoint, is determined based on the output commit information received from the processes in response to the request for information in conjunction with steps 610 and 612. As discussed above, assume that the checkpoint and communication pattern contains output commit points 512 and 514 (FIG. 5A). In this situation, the checkpoints $C_{2,2}$ and $C_{4,1}$ may be identified as the target set of checkpoints S, since these are the earliest checkpoints for processes $P_2$ and $P_4$ respectively, subsequent to the output commit points. As discussed above, during the second rollback, it is often desirable to rollback as far as possible, without having to revoke any output.

Figure 9A:
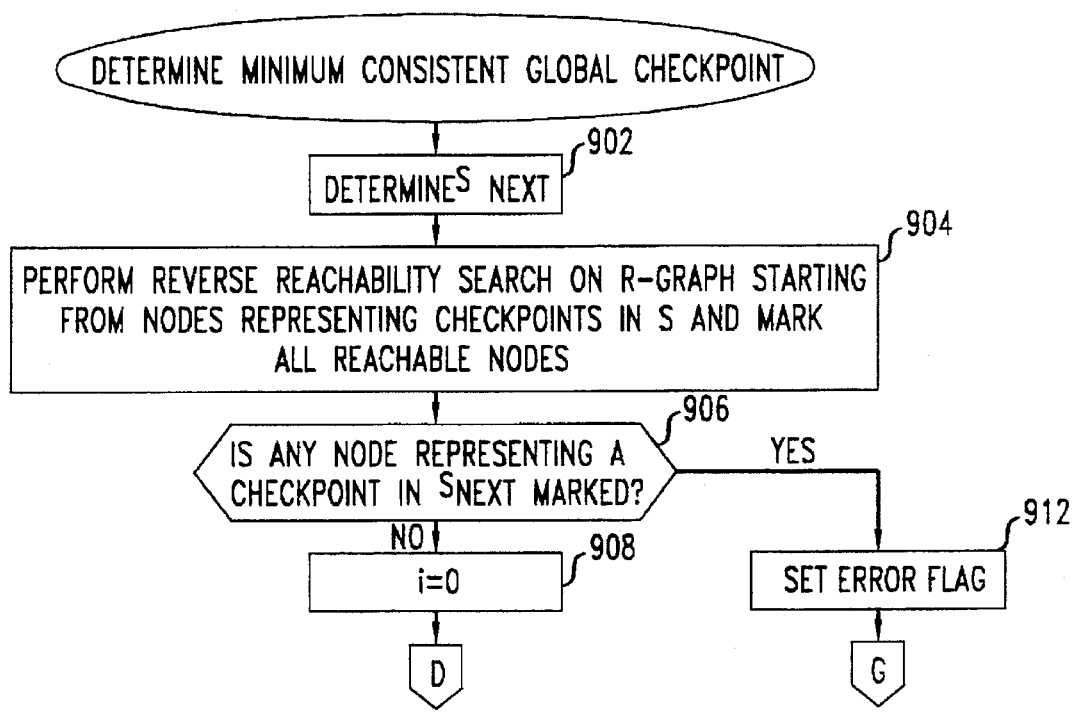
FIGS. 9A–9B shows a flowchart illustrating the determination of the minimum consistent global checkpoint in accordance with a centralized embodiment of the invention.
Figure 9B:
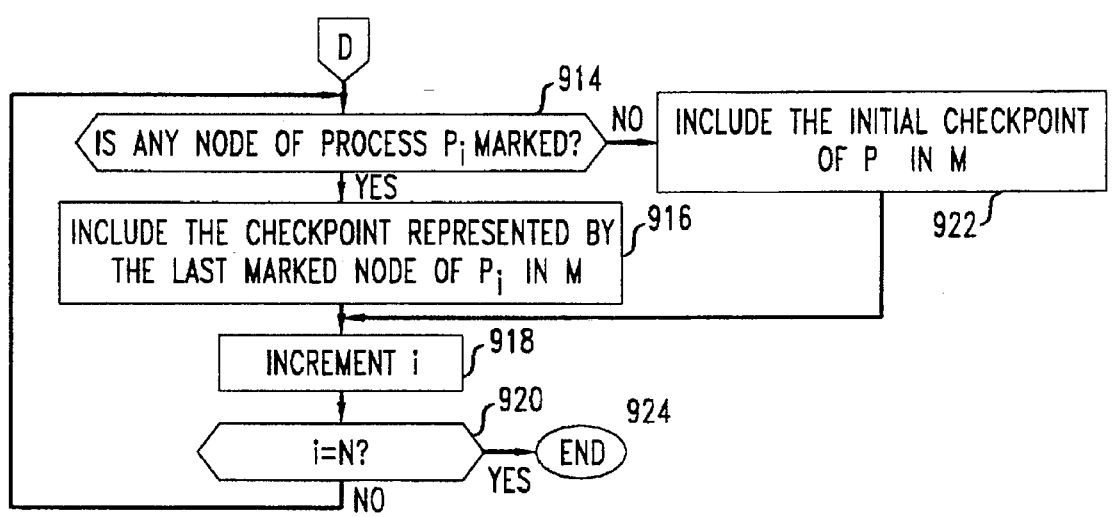
Figure 10:
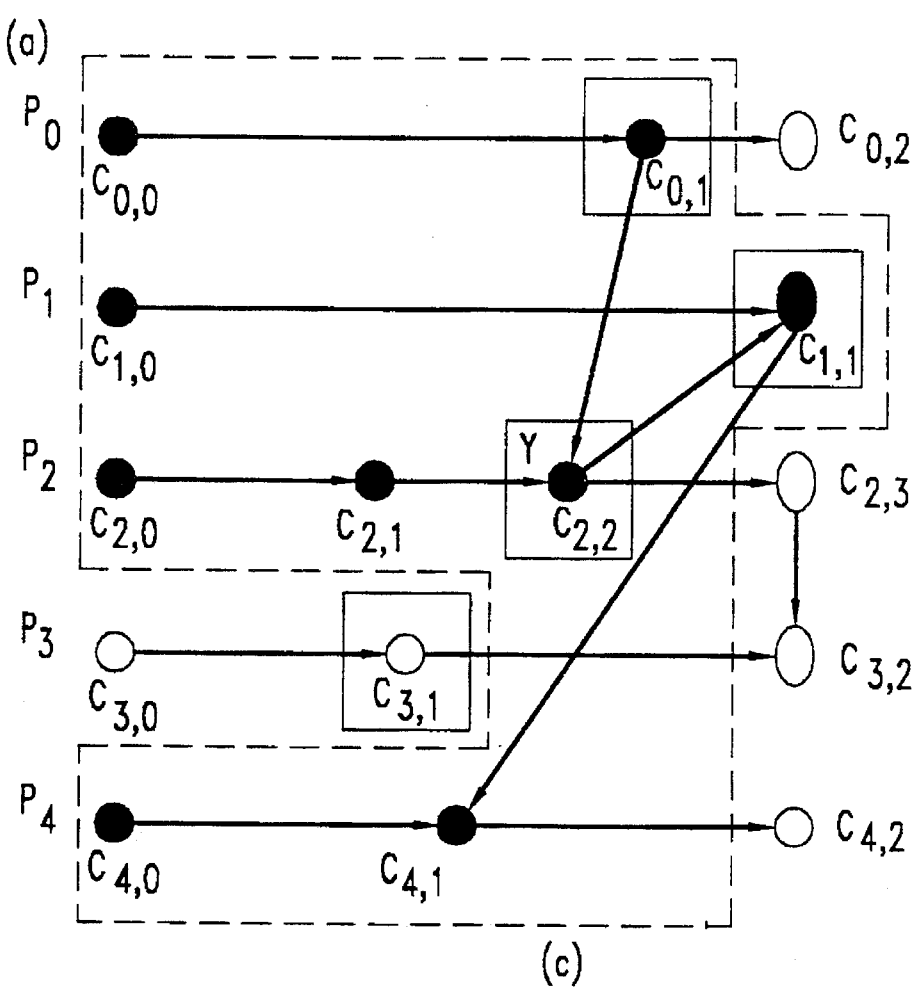
FIG. 10 shows the rollback dependency graph for the checkpoint and communication pattern of FIG. 5A.

In step 620, the watchdog process determines the minimum consistent global checkpoint which includes the target set of checkpoints S. The determination of the minimum consistent global checkpoint is described in conjunction with the flow diagram of FIGS. 9A and 9B and the rollback dependency graph of FIG. 10 (which is the same rollback dependency graph as shown in FIG. 5B, which is constructed from the checkpoint and communication pattern of FIG. 5A). In step 902 the set $S_{next}$ is determined as described above in conjunction with step 702 (FIG. 7). In this example, the set $S_{next}$ contains the checkpoints $\{C_{2,3}, C_{4,2}\}$. In step 904, a reverse reachability search (i.e. following the reverse direction of the edges) is performed on the rollback dependency graph, starting from the nodes in the rollback dependency graph which represent the checkpoints in the target set S of checkpoints. One technique for performing a reverse reachability search is to reverse the direction of the directed edges in the rollback dependency graph, and then perform a reachability search. Reachability searches, and the implementation of such searches in a computer system, are well known in the art. See, B. Bhargava and S. R. Lian, "Independent Checkpointing and Concurrent Rollback for Recovery—An Optimistic Approach", in *Proc. IEEE Symp. Reliable Distributed Syst.*, pages 3–12, 1988. Each node reachable during the reverse reachability search is marked. In the example rollback dependency graph shown in FIG. 10, given the target set of checkpoints $C_{2,2}$ and $C_{4,1}$, a reverse reachability search is performed starting from each of the nodes $c_{2,2}$ and $c_{4,1}$. The nodes reachable from the search are marked, as illustrated in FIG. 10, and include the nodes $\{c_{0,0}, c_{0,1}, c_{1,0}, c_{1,1}, c_{2,0}, c_{2,1}, c_{2,2}, c_{4,0}, c_{4,1}\}$.

In step 906 it is determined whether any node representing a checkpoint in $S_{next}$ is marked. Since nodes $C_{2,3}$ and $C_{4,2}$ are not marked, the test is false, and control passes to step 908. In step 908 the counter variable i is initialized to 0. In step 914 (FIG. 9B) it is determined whether any node for process $P_i$ is marked. Since i=0 in this example, it is determined whether any node for process $P_0$ is marked. Since nodes $c_{0,0}$ and $c_{0,1}$ are marked, the test of step 914 is true and control passes to step 916. In step 916, the last marked node of process $P_i$ is included in the set of checkpoints which make up the minimum consistent global checkpoint. In this example, the last marked node of process $P_0$ is node $c_{0,1}$ and therefore checkpoint $C_{0,1}$ is included in the minimum consistent global checkpoint.

In step 918 the counter i is incremented by one and it is determined in step 920 if i equals N. If it is, then processing ends in step 924 and control returns to step 626, which will be discussed below. If i is not equal to N, then control passes to step 914, and steps 914, 916 and 922 are repeated for each process. Continuing with the example, in the second iteration, the test in step 914 is "yes" because nodes $c_{1,0}$ and $c_{1,1}$ are marked for process $P_1$. Thus, the checkpoint represented by the last marked node for process $P_1$ is included in the minimum consistent global checkpoint. Since node $c_{1,1}$ is the last marked node for process $P_1$, checkpoint $C_{1,1}$ is included in the minimum consistent global checkpoint. During the third iteration, the test in step 914 is "yes" because nodes $c_{2,0}$, $c_{2,1}$ and $c_{2,2}$ are marked for process $P_2$. Thus, the checkpoint represented by the last marked node for process $P_2$ is included in the minimum consistent global checkpoint. Since node $c_{2,2}$ is the last marked node for process $P_2$, checkpoint $C_{2,2}$ is included in the minimum consistent global checkpoint. During the fourth iteration, the test in step 914 is "no" because none of the nodes are marked for process $P_3$. Thus, the initial checkpoint for process $P_3$, specifically checkpoint $C_{3,0}$, is included in the minimum consistent global checkpoint in step 922. During the fifth iteration, the test in step 914 is "yes" because nodes $c_{4,0}$ and $c_{4,1}$ are marked for process $P_4$. Thus, the checkpoint represented by the last marked node for process $P_4$ is included in the minimum consistent global checkpoint. Since node $c_{4,1}$ is the last marked node for process $P_4$, checkpoint $C_{4,1}$ is included in the minimum consistent global checkpoint.

After the fifth iteration, the test in step 920 will be "yes" and processing will end in step 924, and control will return to step 626, which will be discussed in further detail below. At this point, the minimum consistent global checkpoint consists of $\{C_{0,1}, C_{1,1}, C_{2,2}, C_{3,0}, C_{4,1}\}$.

If it were determined in step 906 that a node representing a checkpoint in $S_{next}$ is marked then an error flag is set in step 912 because this condition indicates that there is no consistent global checkpoint including the checkpoints in the target set S. Control then passes to step 618 again, in which the target set of checkpoints is determined. Since the error flag was set in step 912, a new target set of checkpoints will be determined in order to bypass the error condition. The determination of a target set of checkpoints and the attempt to determine a minimum consistent global checkpoint based on that target set will continue until a consistent global checkpoint is found. If a coordinated checkpoint exists, then a minimum consistent global checkpoint can always be found to include the checkpoints which make up the coordinated checkpoint.

Returning now to the watchdog process; and FIG. 6, after the determination of either the minimum consistent global checkpoint (step 620) or the maximum consistent global checkpoint (step 624), control passes to step 626. In step 626, the watchdog process broadcasts an action request to the processes of the system 100. The action request indicates the checkpoint to which each of the processes should rollback. Thus, in the present example, assuming that the error occurrence is one, and therefore the watchdog determined the maximum consistent global checkpoint, the watchdog sends process $P_0$ an action request indicating that process $P_0$ should rollback to checkpoint $C_{0,1}$. The watchdog sends process $P_1$ an action request indicating that process $P_1$ should rollback to checkpoint $C_{1,1}$. The watchdog sends process $P_2$ an action request indicating that process $P_2$ should rollback to checkpoint $C_{2,2}$. The watchdog sends process $P_3$ an action request indicating that process $P_3$ should rollback to checkpoint $C_{3,1}$. The watchdog sends process $P_4$ an action request indicating that process $P_4$ should rollback to checkpoint $C_{4,2}$. After broadcasting the request messages, the watchdog process returns to step 602 to continue monitoring the execution of the processes.

Returning now to the functioning of the individual processes, each process rolls back to the indicated checkpoint in step 1106 (FIG. 11) and continues processing. It is noted that processes $P_1$ and $P_4$ roll back to volatile checkpoints $C_{1,1}$ and $C_{4,2}$ respectively. A rollback to a volatile checkpoint entails continuing execution from the volatile checkpoint, and therefore there is no restoration of the process to a previously checkpointed state and therefore no processing is lost. For consistency of terminology, this procedure is called a rollback. Thus, as used herein, the term rollback includes the continuation of execution from the volatile checkpoint of a process. Continuing with the example, when step 626 is reached a second time, it indicates that the watchdog process has detected that the same error has occurred twice, and therefore a rollback to a minimum consistent global checkpoint is appropriate. Thus, the watchdog process will send out appropriate action requests instructing the processes to rollback to the minimum consistent global checkpoint $\{C_{0,1}, C_{1,1}, C_{2,2}, C_{3,0}, C_{4,1}\}$. If the same error occurs a third time, then the test in step 606 would be "yes", and control passes to step 608. At this point, since a rollback to the maximum consistent global checkpoint resulted in the same error, and a further rollback to the minimum consistent global checkpoint also resulted in the same error, the system is rolled back to the initial coordinated checkpoint. Such a checkpoint would be $\{C_{0,0}, C_{1,0}, C_{2,0}, C_{3,0}, C_{4,0}\}$. As discussed above, such an initial coordinated checkpoint may also represent the beginning of execution of the processes.

2.2.2 Distributed Determination

In a distributed embodiment of the invention, error recovery and the minimum and maximum consistent global checkpoints are determined in a distributed fashion by the individual processes. The watchdog monitoring process monitors the system for failures. Upon detection of a failure, the watchdog process determines a target set of checkpoints. The target set is broadcast to the individual processes and the individual processes determine the appropriate rollback checkpoints. In order to accomplish this distributed rollback determination, it is necessary for the processes to have rollback dependency graph dependency information for the other processes and their checkpoints. One way to provide this information to the processes is through transitive dependency tracking.

2.2.2.1 Transitive Dependency Tracking

Transitive dependency tracking is a well known technique and thus will be described only briefly herein. For a detailed description of transitive dependency tracking see, A. P. Sistla and J. L. Welch, "Efficient Distributed Recovery Using Message Logging", in *Proc. 8th ACM Symposium on Principles of Distributed Computing*, pages 223–238, Aug. 1989, which is incorporated by reference herein. In a system with N processes, each process $P_i$ maintains a transitive dependency vector, $D_i$, of size N. The entry $D_i[i]$ is initialized to 1 upon system initialization, and incremented after process $P_i$ takes a new checkpoint and stores the checkpointed state to memory. Thus, the entry $D_i[i]$ at any particular point during execution represents the current checkpoint interval index for process $P_i$, or stated equivalently, represents the checkpoint index of the next checkpoint of process $P_i$. The other entries of the dependency vector, $D_i[j]$ where $j \neq i$, are initialized to −1. The entries $D_i[j]$ where $j \neq i$ are updates as follows. When a process $P_i$ sends a message m from the interval $I_{i,x}$, $P_i$'s current $D_i$ vector is sent along with (piggybacked on) message m. When the receiving process $P_j$ receives m in the interval $I_{j,y}$, $P_j$ updates its $D_j$ vector to be the component-wise maximum of its current $D_j$ and the piggybacked $D_i$, that is: $D_j[k]=\max(D_j[k],D_i[k])$, $0 \leq k \leq N-1$. Thus, in this manner, the dependency vector entries $D_i[j]$ where $j \neq i$ are used to record the highest index of any checkpoint intervals of process $P_j$, on which process $P_i$'s current state depends. When $P_j$ takes a next checkpoint, $C_{j,y}$, the vector $D_j$ at the execution point immediately prior to taking the checkpoint is associated with $C_{j,y}$ and denoted by $D_{j,y}$.

Figure 12:
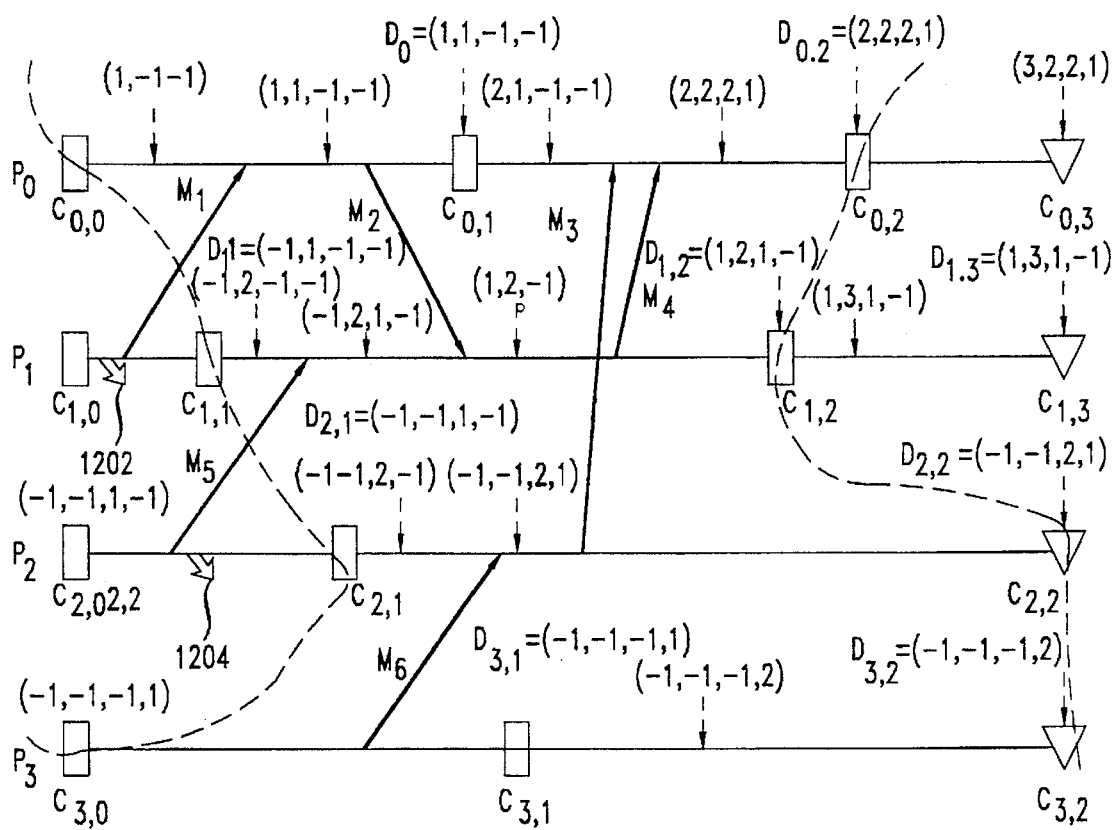
FIG. 12 shows an example checkpoint and communication pattern illustrating the transitive dependency tracking mechanism in accordance with a distributed embodiment of the invention.

An example of the above described transitive dependency tracking mechanism is described in conjunction with the checkpoint and communication pattern shown in FIG. 12. FIG. 12 shows the checkpoint and communication pattern for four processes $P_0, P_1, P_2, P_3$. The dependency vectors are shown in brackets ([]) with a broken line arrow indicating the approximate point in time at which the dependency vector is created or updated. System initialization occurs at checkpoints $C_{0,0}, C_{1,0}, C_{2,0}, C_{3,0}$ and immediately following system initialization the dependency vector for each of the processes is initialized so that entry $D_i[i]=1$, and the remaining entries are initialized so that entry $D_i[j]=-1$ where $j \neq i$. With respect to process $P_0$, the first message event is the receipt of message $m_1$ from process $P_1$. As discusses above, the dependency vector of the sending process is piggybacked along with the message. Immediately after receipt of the message, process $P_0$ updates its dependency vector by taking the component-wise maximum of the vectors $[1,-1,-1,-1]$ and $[-1,1,-1,-1]$, with the resulting vector being $[1,1,-1,-1]$, as shown in FIG. 12. When process $P_0$ takes checkpoint $C_{0,1}$, along with the checkpointed information, the dependency vector at the time of the checkpoint is also checkpointed, and is denoted $D_{0,1}$ such that $D_{0,1}=[1,1,-1,-1]$ is stored on non-volatile storage along with checkpoint $C_{0,1}$. Immediately after taking the checkpoint, the dependency vector for process $P_0$ is updated such that $D_0[0]=D_0[0]+1$, with the resulting vector being $[2,1,-1,-1]$.

Given the above description, the calculation of the remaining dependency vectors shown in FIG. 12 would be clear to one skilled in the art and will not be described herein.

2.2.2.2 Requirements for Distributed Processing

In order to determine the maximum and minimum consistent global checkpoints in a distributed fashion, the transitive dependency tracking technique described above should carry full information about rollback dependency graph reachability. As a result, some constraint should be imposed on the checkpoint and communication pattern. In order to determine the maximum and minimum consistent global checkpoints using the distributed methods described below, the checkpoint and communication pattern should satisfy a Rollback-Dependency trackability (RD-trackability) model (i.e. the checkpoint and communication pattern should be RD-trackable). A checkpoint and communication pattern is RD-trackable if the following property holds:

for any two checkpoints $C_{i,x}$ and $C_{j,y}$, node $c_{i,x}$ reaches node $c_{j,y}$ in the rollback dependency graph if and only if $D_{j,y}[i] \geq x$.

One model which satisfies the RD-trackability constraint is the Fixed Dependency-After-Send (FDAS) model. In this model, after the first message-sending event in any checkpoint interval, the transitive dependency vector remains unchanged until the next checkpoint. A checkpoint and communication pattern which satisfies the FDAS model may be maintained by requiring each process to follow a communication induced checkpointing protocol. An after_first_sent_flag is associated with each process and is used to indicate whether any messages have been sent by that process during a given checkpoint interval. The protocol is as follows:

when taking a checkpoint, a process resets its after_first_sent_flag to zero;

upon sending a message, a process sets its after_first_sent_flag to one if the flag is zero;

prior to processing a message, a process takes a checkpoint if its after_first_sent_flag is one and the receipt of the message would cause the process' transitive dependency vector to change.

Thus, if the processes follow the above described checkpointing protocol, then the checkpointing and communication pattern of the processes will satisfy the FDAS model, and is thus RD-trackable. This communication induced checkpointing protocol is incorporated into the description of message processing and checkpointing below.

It is to be noted that the checkpoint and communication pattern shown in FIG. 12 satisfies the FDAS model described above, and as a result, also satisfies RD-trackability.

2.2.2.3 Message Processing

Figure 13:
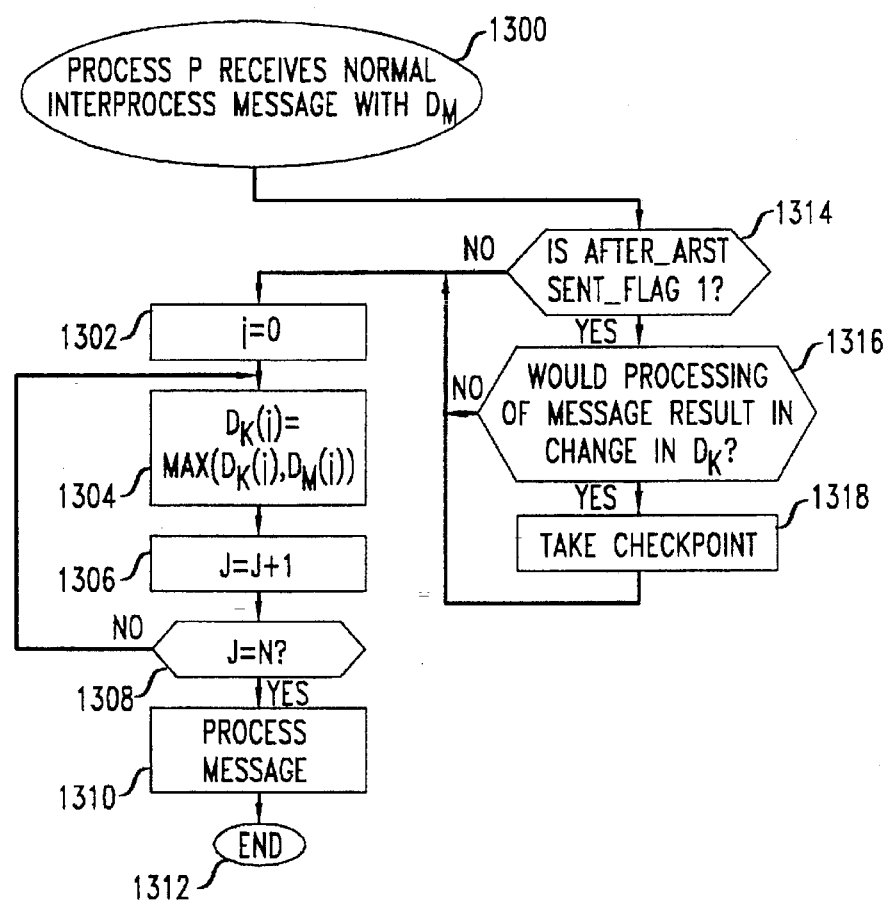
FIG. 13 shows a flowchart of the processing of a normal inter-process message in accordance with a distributed embodiment of the invention.

Message processing in accordance with the distributed embodiment is described in conjunction with the flowchart of FIG. 13. In step 1300, a process $P_k$ receives from process $P_m$ a normal inter-process message along with a piggybacked dependency vector $D_m$. In step 1314 it is determined whether the after_first_sent_flag associated with process $P_k$ is 1. If it is, then in step 1316 it is determined whether the processing of this message, in accordance with the transitive dependency technique described above, would result in a change in process $P_k$'s current dependency vector, $D_k$. If it would, then process $P_k$ takes a checkpoint in step 1318. After step 1318, and if either of the tests in step 1314 or 1316 is "no", then control is passed to step 1302. It is noted that steps 1314, 1316, and 1318 implement the communication induced checkpointing protocol which will result in a checkpoint and communication pattern which satisfies the FDAS model, as described above.

In step 1302 a counter j is set to 0. In step 1304, process $P_k$ updates its current dependency vector, $D_k$, such that $D_k[j]=\max(D_k[j],D_m[j])$. In step 1306, counter j is incremented by one. In step 1308 it is determined whether j is equal to the number of processes N. If not, then steps 1304, 1306, and 1308 are repeated. In this manner, the dependency vector $D_m$ is updated to be the component-wise maximum of $D_m$ and $D_k$. If j is equal to N, then control is passed to step 1310, in which process $P_k$ processes the received message. Such processing would vary depending upon the application of the computer system, and the details of such processing is not important for the description of the present invention. The processing of the received message ends in step 1312.

2.2.2.4 Checkpointing

As discussed above in conjunction with the centralized embodiment, during execution of the processes in the system, the processes will periodically take checkpoints. The basic checkpointing procedure in this distributed embodiment is the same as described above in conjunction with the centralized embodiment, and only the differences in the procedure for the distributed embodiment will be discussed herein.

In order to implement the transitive dependency tracking technique, when a process $P_k$ takes a checkpoint $C_{k,x}$, the current dependency vector $D_k$ of the process is saved with the checkpointed information and is denoted $D_{k,x}$.

In addition, after taking a checkpoint, the after_first_sent_flag associated with process $P_k$ is reset to zero. The resetting of the after_first_sent_flag implements the communication induced checkpointing protocol which will result in a checkpoint and communication pattern which satisfies the FDAS model, as described above.

2.2.2.5 Watchdog Process

Figure 14A:
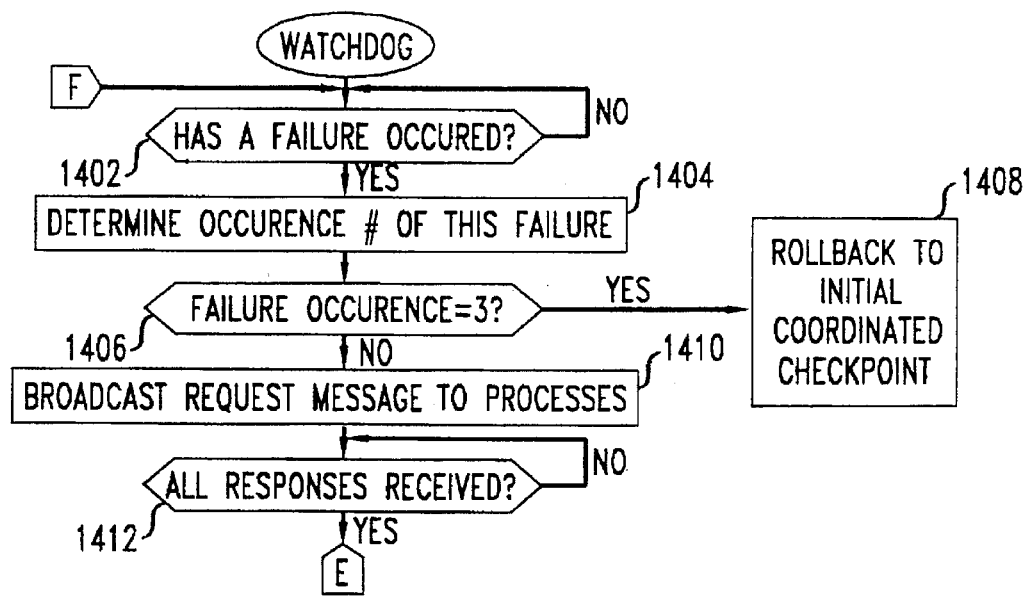
FIGS. 14A and 14B show a flowchart of the functioning of the watchdog process in accordance with a distributed embodiment of the invention.
Figure 14B:
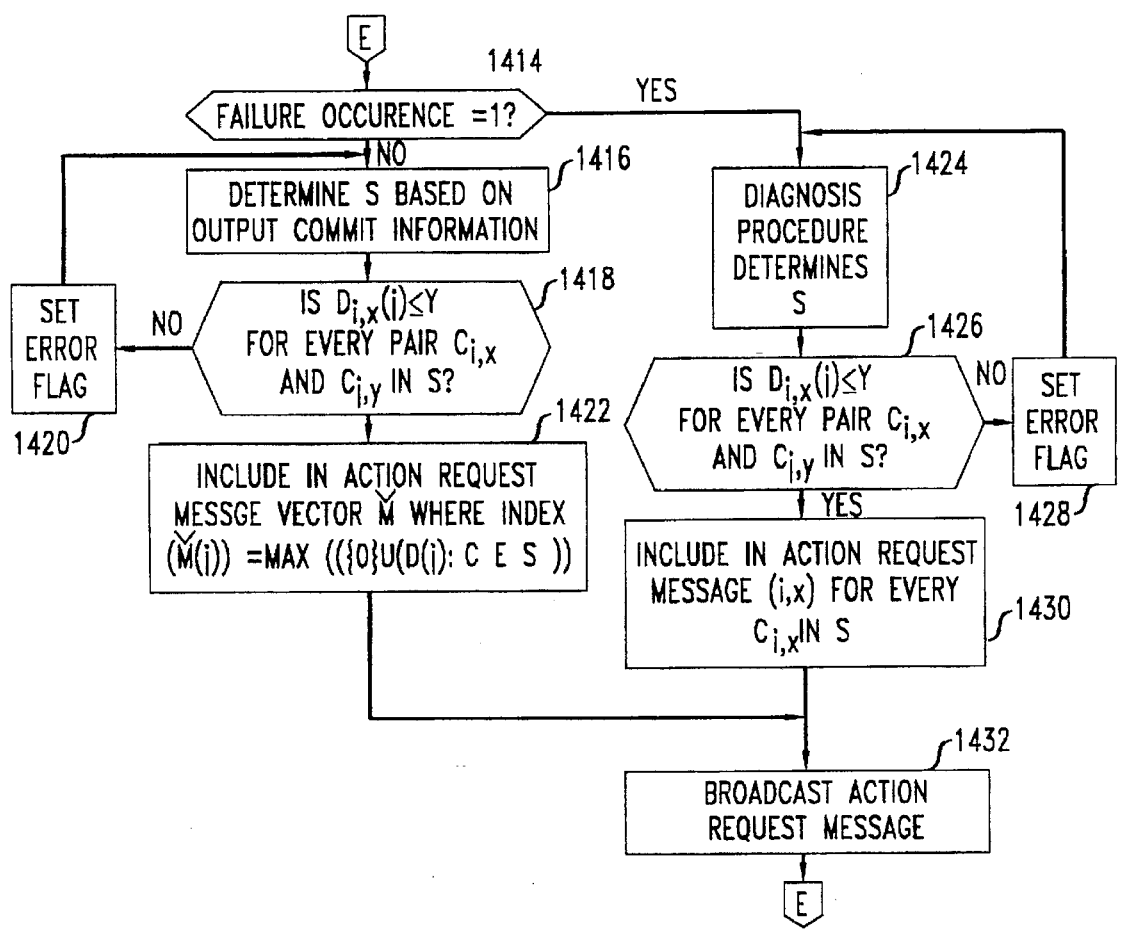

In this distributed embodiment of the invention, the minimum and maximum consistent global checkpoints are determined in a distributed fashion by each of the processes. As in the centralized embodiment, a watchdog process monitors the system for failures. Upon detection of a failure, the watchdog process determines the target set of checkpoints and the appropriate recovery mechanism (i.e. minimum consistent global checkpoint or maximum consistent global checkpoint), and communicates the recovery mechanism to the individual processes. The individual processes handle the actual determination of the appropriate rollback checkpoints. The functioning of the watchdog process in this distributed embodiment is described in conjunction with the flow diagram of FIGS. 14A and 14B, and the example checkpoint and communication pattern of FIG. 12.

The watchdog process continuously executes in one of the processors 112 of system 100. Steps 1402 through 1412 of flowchart 14 are the same as steps 602 through 612 of FIG. 6, and will not be described in detail here.

Figure 15:
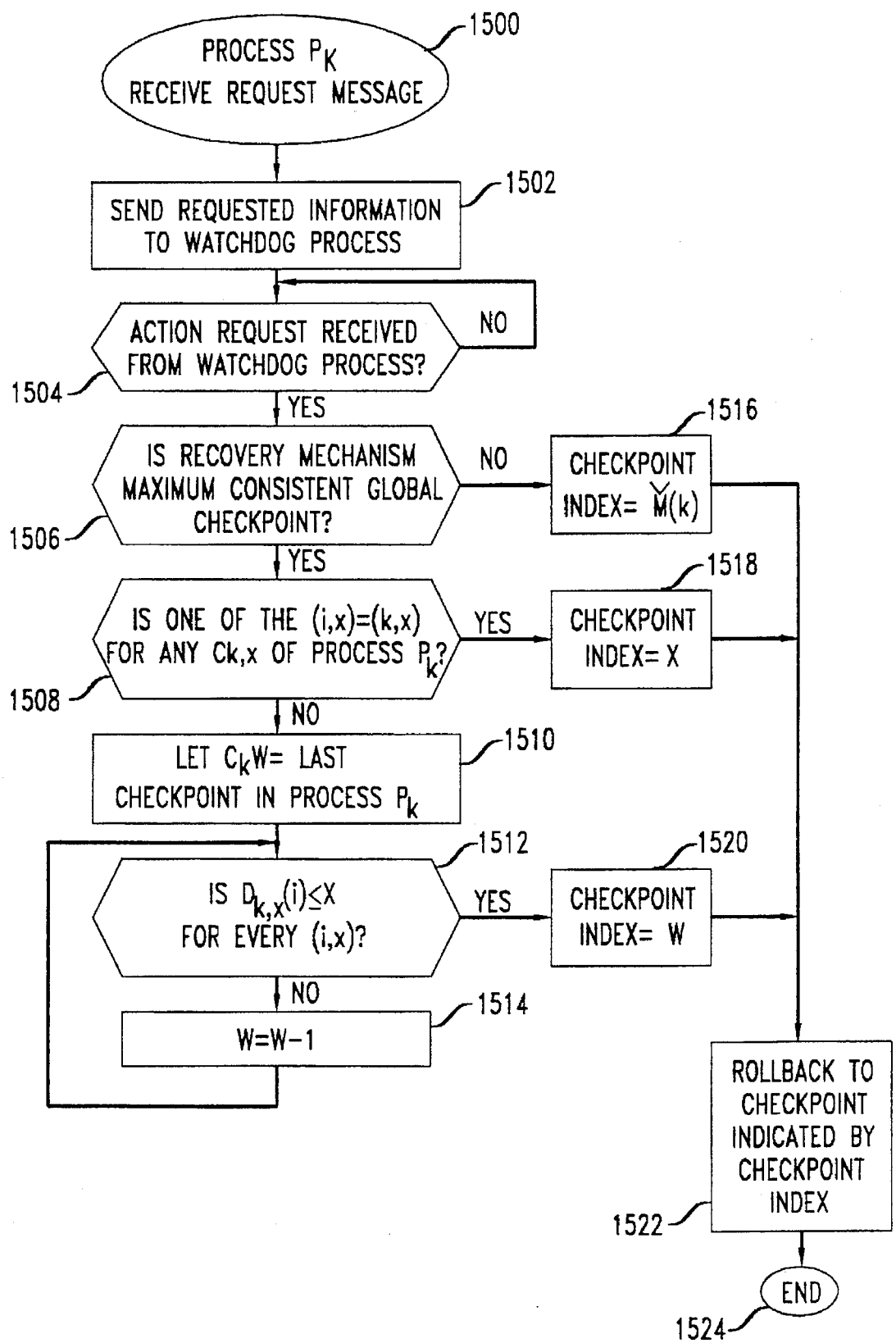
FIG. 15 shows a flowchart illustrating the processing of a request message by a process in accordance with a distributed embodiment of the invention.

After sending request messages to the processes in step 1410, the watchdog process waits at step 1412 until all responses are received. Upon receipt of a request message by a process, the process processes the request as shown in the flowchart of FIG. 15. In step 1500, the process receives the request message. In step 1502 the process sends the requested information to the watchdog process. The process then waits for an action request from the watchdog process in step 1504. These steps are similar to steps 1100–1104 (FIG. 11) as discussed above in conjunction with the centralized embodiment.

Returning now to the functioning of the watchdog process and FIG. 14, upon receipt of all responses from the processes, the watchdog process determines in step 1414 if the failure occurrence equals 1. As discussed above, in accordance with the software error recovery aspects of the present invention, the first time an error occurs, it is desirable to rollback all process to the maximum consistent global checkpoint, in order to reduce the amount of lost processing caused by the rollback. If the current error is the first time the error has occurred, then in step 1424 a diagnosis procedure is invoked in order to determine the target set of checkpoints, S. This diagnosis procedure may be the same as the one discussed above in conjunction with step 622 of FIG. 6. It is assumed for this example, that this is the first time occurrence of the error, and that the diagnosis procedure has identified checkpoints $C_{0,2}$ and $C_{1,2}$ as the target set of checkpoint S. In step 1426 it is determined whether, for every checkpoint pair $C_{i,x}$ and $C_{j,y}$ in S, $D_{i,x}[j] \leq y$. In this example, this test is true, and control passes to step 1430. If the test in step 1426 were false, it would indicate that a maximum consistent global checkpoint containing the target set S of checkpoints, cannot be found. In such a case, an error flag is set in step 1428 and control is passed to the diagnosis procedure (step 1424) to determine a new target set of checkpoints. The diagnosis procedure knows that it must be identify a new set of target checkpoints because it recognizes that the error flag is set. The determination of a target set of checkpoints by the diagnosis procedure and the test of step 1426 will continue until the test in step 1426 is satisfied. If a coordinated checkpoint exists, then a maximum consistent global checkpoint can always be found to include the checkpoints which make up the coordinated checkpoint.

Returning now to step 1430, the watchdog process assembles the action requests message and includes in the action request message (i,x) for every $C_{i,x}$ in S. In this example, this would include (0,2) and (1,2) since the set S includes of the checkpoints $C_{0,2}$ and $C_{1,2}$. The action request message would also include an indication of the appropriate recovery mechanism (i.e. rollback to minimum consistent global checkpoint or maximum consistent global checkpoint). In step 1432, the watchdog process broadcasts the action request message to every process. After broadcasting the action request message, the watchdog process returns to step 1402.

Returning now to FIG. 15, each process $P_k$ receives the action request message and the process breaks out of the loop in step 1504 and control passes to step 1506. In step 1506 the process determines if the recovery mechanism is a rollback to a maximum consistent global checkpoint. In the present example, the test in step 1506 would be true and control passes to step 1508. In step 1508 it is determined whether one of the (i,x) in the action request message equals (k,x) for any checkpoint $C_{k,x}$ of process $P_k$ (i.e. process $P_k$ determines whether one of its checkpoints is in the target set S.) If the test in step 1508 is true then control passes to step 1518 in which process $P_k$ determines that its checkpoint index is x, where x is taken from the pair (i,x) which satisfied the test of step 1508 (i.e. $P_k$ chooses its checkpoint which is in the target set S). For process $P_0$ in the present example, the test in step 1508 would be true, because process $P_0$ contributes checkpoint $C_{0,2}$ to the target set. Thus, in step 1518 the checkpoint index for process $P_0$ would be set to 2. In step 1522, process $P_0$ would rollback to checkpoint $C_{0,2}$, and process $P_0$'s processing of a request message ends in step 1524.

In the present example, since process $P_1$ also contributes a checkpoint ($C_{1,2}$) to the target set, process $P_1$ processes the action request message in a manner similar to process $P_0$ and process $P_1$ rolls back to checkpoint $C_{1,2}$ in step 1522.

If the test in step 1508 is "no", then control passes to step 1510 in which the last checkpoint in process $P_k$ is chosen and is denoted $C_{k,w}$. In step 1512 it is determined whether $D_{k,w}[i] \leq x$ for every (i,x) in the action request message. If the test in step 1512 is satisfied, then control passes to step 1520, in which the checkpoint index for process $P_k$ is set to w, and process $P_k$ rolls back to checkpoint $C_{k,w}$ in step 1522. If the test in step 1512 is not satisfied, then in step 1514, w is decremented by one, in order to set $C_{k,w}$ to the next earlier checkpoint, and control is passed to step 1512. Steps 1512 and 1514 are repeated until the test in step 1512 is satisfied. If a coordinated checkpoint exists, then the test in step 1512 will eventually be satisfied because at least the checkpoint which process $P_k$ contributes to the coordinated checkpoint will satisfy the test. In the current example, during processing of the action request message by process $P_2$, the test in step 1508 would be "no" because process $P_2$ does not contribute a checkpoint to the target set. Thus, in step 1510, $C_{k,w}$ is set to $C_{2,2}$ because $C_{2,2}$ is the last checkpoint for process $P_2$. The test in step 1512 would be true because, for process $P_2$, for every (i,x) in the action request message $D_{k,w}[i] \leq x$. In more detail, for (i,x)=(0,2), $D_{2,2}[0]=-1 \leq 2$; and for (i,x)=(1,2), $D_{2,2}[1]=-1 \leq 2$. Thus, the checkpoint index for process $P_2$ would be 2, and process $P_2$ would roll back to checkpoint $C_{2,2}$ in step 1522. In a similar manner, the checkpoint index for process $P_3$ would be 2, and process $P_3$ would roll back to checkpoint $C_{3,2}$ in step 1522. After each process processes the action request message according to the flowchart of FIG. 15, the maximum consistent global checkpoint contains the checkpoints {$C_{0,2}$, $C_{1,2}$, $C_{2,2}$, $C_{3,2}$}, and the processes would rollback accordingly, resulting in the recovery line 1210 shown in FIG. 12.

Returning now to FIG. 14, and the functioning of the watchdog process, if it is determined in step 1414 that the failure occurrence is not equal to 1 then the failure occurrence equals 2 and control is passed to step 1416. As discussed above, in accordance with the software error recovery aspects of the present invention, the second time an error occurs, it is desirable to rollback all process to the minimum consistent global checkpoint, in order to introduce the largest amount of nondeterminism in order to bypass the bug, but without rolling back past certain output points. If the current error is the second time the error has occurred, then in step 1416 the target set of checkpoints S to be included in the minimum consistent global checkpoint, is determined based on the output commit information received by the watchdog process from each of the processes in response to the broadcast request message of step 1410. It is assumed for this example, that an error has occurred for the second time, and that checkpoints $C_{1,1}$ and $C_{2,1}$ have been identified as the target set of checkpoints S. This set of checkpoints may have been chosen, for example, based on output commit points 1202 and 1204 shown, in FIG. 12, which represent output points, beyond which, rolling back is undesirable. In step 1418 it is determined whether, for every checkpoint pair $C_{i,x}$ and $C_{j,y}$ in S, $D_{i,x}[j] \leq y$. This is the same test as discussed above in conjunction with step 1426. If the test in step 1418 is "no", it indicates that a minimum consistent global checkpoint containing the target set S of checkpoints, cannot be found. In such a case, an error flag is set in step 1420 and control is passed to step 1416. Since the error flag is set, a new target set of checkpoints will be determined. The determination of a target set of checkpoints and the test of step 1418 will continue until the test in step 1418 is satisfied. If a coordinated checkpoint exists, then a minimum consistent global checkpoint can always be found to include the checkpoints which make up the coordinated checkpoint.

In the present example, the test in step 1418 is true and control is passed to step 1422. In step 1422 a vector $\check{M}$ is calculated, where $\check{M}[j]=\max(\{0\}\cup\{D_{i,x}[j]:C_{i,x}\in S\})$. In other words, each element of vector $\check{M}$ is the component-wise maximum of the dependency vectors associated with the checkpoints in S if the component-wise maximum is greater than or equal to 0. If the component-wise maximum is not greater than or equal to 0, then the element of vector $\check{M}$ is set to 0. In the present example, there are two checkpoints in the set S ($C_{1,1}$ and $C_{2,1}$) and the related dependency vectors are $D_{1,1}=[-1,1,-1,-1]$; $D_{2,1}=[-1,-1,1,-1]$. Taking the component wise maximum of these vectors, the result is $[-1, 1, 1, -1]$. Where the component-wise maximum is less than 0, the element is assigned a value of 0, such that the resulting vector $\check{M}$ in this example would be $\check{M}=[0, 1, 1, 0]$.

After calculating $\check{M}$ in step 1422, the watchdog process broadcasts the vector $\check{M}$, along with an indication of the appropriate recovery mechanism (i.e. rollback to minimum consistent global checkpoint or rollback to maximum consistent global checkpoint), in the action request message in step 1432. After broadcasting the action request message, the watchdog process returns to step 1402. Returning now to the flowchart of FIG. 15, and the processing of the action request message by the individual processes, upon receipt of the action request message, the loop of step 1504 is broken, and it is determine in step 1506 whether the recovery mechanism is rollback to maximum consistent global checkpoint. In the present example, since the error occurrence number is 2, the recovery mechanism is a rollback to a minimum consistent global checkpoint, and control is passed to step 1516, in which the checkpoint index for process $P_k$ is determined to be $\check{M}[k]$. In step 1522, process $P_k$ rolls back to the checkpoint index determined in step 1516. In the present example, upon all processes performing the steps of FIG. 15, the minimum consistent global checkpoint will consists of the checkpoints {$C_{0,0}$, $C_{1,1}$, $C_{2,1}$, $C_{3,0}$} resulting in the recovery line 1220 shown in FIG. 12.

If the test in step 1406 is "yes", it indicates that the same error has occurred three times. Thus, in accordance with the error recovery processing of the invention, the system would rollback to an initial coordinated checkpoint in step 1408. As discussed above, such an initial coordinated checkpoint may represent the beginning of execution of the processes. Thus, in the distributed embodiment, software error recovery processing in accordance with the invention, is carded out in a distributed fashion with each of the processes determines the appropriate checkpoint to rollback to.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for operation of a computer system executing a plurality of processes and for recovering from an error in said system, each of said processes capable of inter-process communication and each of said processes capable of performing periodic local checkpoints, the method comprising the steps of:

in response to an occurrence of said error:
        defining a first set of local checkpoints;
        determining a maximum consistent global checkpoint including said first set of local checkpoints;
        rolling back each of said processes to an associated checkpoint in said maximum consistent global checkpoint;
    in response to a subsequent occurrence of said error:
        defining a second set of local checkpoints;
        determining a minimum consistent global checkpoint including said second set of local checkpoints; and
        rolling back each of said processes to an associated checkpoint in said minimum consistent global checkpoint.

2. The method of claim 1 further comprising the step of:
    in response to an occurrence of said error occurring after said subsequent occurrence:
        rolling back each of said processes to an associated coordinated checkpoint.

3. The method of claim 1 wherein said maximum consistent global checkpoint includes at least one volatile checkpoint.

4. The method of claim 1 wherein said minimum consistent global checkpoint includes at least one volatile checkpoint.

5. The method of claim 1 wherein said steps of determining a maximum consistent global checkpoint and determining a minimum consistent global checkpoint are performed by a central process.

6. The method of claim 5 wherein said inter-process communication and periodic local checkpoints define a checkpoint and communication pattern, wherein $P_i$ represents a process where i is the process identification, and where $C_{i,x}$ represents the $x^{th}$ checkpoint of process $P_i$, wherein said step of determining a maximum consistent global checkpoint further comprises the steps of:
   creating a rollback dependency graph representing said checkpoint and communication pattern, said rollback dependency graph comprising nodes and edges, wherein said nodes represent said periodic local checkpoints and said edges represent rollback dependency of said periodic local checkpoints;
   defining a target set S of local checkpoints, each from a different process;
   determining a set $S_{next}$ of local checkpoints such that $S_{next} = \{C_{i,x+1} : C_{i,x} \in S\}$;
   performing a reachability search on said rollback dependency graph starting from each node representing a local checkpoint in $S_{next}$ and marking each reachable node in said rollback dependency graph; and
   for each process, identifying the most recent checkpoint of the process which is represented by an unmarked node in said rollback dependency graph.

7. The method of claim 5 wherein said inter-process communication and periodic local checkpoints define a checkpoint and communication pattern and wherein said step of determining a minimum consistent global checkpoint further comprises the steps of:
   creating a rollback dependency graph representing said checkpoint and communication pattern, said rollback dependency graph comprising nodes and directed edges, wherein said nodes represent said periodic local checkpoints and said directed edges represent rollback dependency of said periodic local checkpoints;
   defining a target set of local checkpoints, each from a different process;
   performing a reverse reachability search on said rollback dependency graph starting from each node representing a local checkpoint in said target set and marking each reachable node in said rollback dependency graph; and
   for each process which contains a checkpoint which is represented by a marked node in said rollback dependency graph, identifying the most recent checkpoint of the process which is represented by a marked node in said rollback dependency graph.

8. The method of claim 1 wherein said steps of determining a maximum consistent global checkpoint and determining a minimum consistent global checkpoint are performed by said processes in a distributed manner.

9. The method of claim 8 wherein each of said processes locally maintains dependency information, said dependency information representing said checkpoint and a communication pattern, said step of determining a maximum consistent global checkpoint further comprising the step of:
   each of said processes locally determining a checkpoint in the maximum consistent global checkpoint.

10. The method of claim 8 wherein each of said processes locally maintains dependency information, said dependency information representing said checkpoint and communication pattern, said step of determining a minimum consistent global checkpoint further comprising the step of:
   each of said processes locally determining a checkpoint in the minimum consistent global checkpoint.

11. A method for operation of a computer system executing a plurality of processes, $P_i$, where i is the process identification, and for recovering from an error in said system, each of said processes capable of inter-process communication, and each of said processes capable of performing periodic local checkpoints, where $C_{i,x}$ represents the $x^{th}$ checkpoint of process $P_i$, and wherein said inter-process communication and periodic local checkpoints define a checkpoint and communication pattern, the method comprising the steps of:
   creating a rollback dependency graph representing said checkpoint and communication pattern, said rollback dependency graph comprising nodes and edges, wherein said nodes represent said periodic local checkpoints and said edges represent rollback dependency of said periodic local checkpoints;
   defining a target set S of local checkpoints, each from a different process;
   determining a set $S_{next}$ of local checkpoints such that $S_{next} = \{C_{i,x+1} : C_{i,x} \in S\}$;
   performing a reachability search on said rollback dependency graph starting from each node representing a local checkpoint in $S_{next}$ and marking each reachable node in said rollback dependency graph; and
   for each process $P_i$, rolling back execution of the process to the most recent checkpoint of the process which is represented by an unmarked node in said rollback dependency graph.

12. The method of claim 11 wherein, for at least one of said processes, said most recent checkpoint of the process which is represented by an unmarked node in said rollback dependency graph is a volatile checkpoint.

13. The method of claim 11 wherein, for at least one of said processes, said most recent checkpoint of the process which is represented by an unmarked node in said rollback dependency graph is a non-volatile checkpoint.

14. A method for operation of a computer system executing a plurality of processes and for recovering from an error in said system, each of said processes capable of inter-process communication, and each of said processes capable of performing periodic local checkpoints, wherein said inter-process communication and periodic local checkpoints define a checkpoint and communication pattern, the method comprising the steps of:
   creating a rollback dependency graph representing said checkpoint and communication pattern, said rollback dependency graph comprising nodes and directed edges, wherein said nodes represent said periodic local checkpoints and said directed edges represent rollback dependency of said periodic local checkpoints;
   defining a target set of local checkpoints, each from a different process;
   performing a reverse reachability search on said rollback dependency graph starting from each node representing a local checkpoint in said target set and marking each reachable node in said rollback dependency graph; and
   for each process which has a checkpoint represented by a marked node in said rollback dependency graph, rolling back execution of the process to the most recent checkpoint of the process which is represented by a marked node in said rollback dependency graph.

15. The method of claim 14 wherein said step of performing a reverse reachability search on said rollback dependency graph further comprises the step of:

reversing said directed edges of said rollback dependency graph.

16. The method of claim 14 wherein, for at least one of said processes, the most recent checkpoint of the process which is represented by a marked node in said rollback dependency graph is a volatile checkpoint.

17. The method of claim 14 wherein, for at least one of said processes, the most recent checkpoint of the process which is represented by a marked node in said rollback dependency graph is a non-volatile checkpoint.

18. A method for operation of a computer system executing a plurality of processes, $P_i$, where i is the process identification, and for recovering from an error in said computer system, each of said processes capable of inter-process communication, and each of said processes capable of performing periodic local checkpoints, where $C_{i,x}$ represents the xth checkpoint of process $P_i$, and wherein said inter-process communication and periodic local checkpoints define a checkpoint and communication pattern, the method comprising the steps of:

each of said processes locally maintaining dependency information, said dependency information representing said checkpoint and communication pattern;

defining a target set of local checkpoints, each from a different process;

upon receipt of an action request, each of said processes $P_i$ locally determining a checkpoint $C_{i,x}$ using said locally maintained dependency information, wherein $C_{i,x}$ is a checkpoint in a maximum consistent global checkpoint including said target set of checkpoints; and each of said processes $P_i$ rolling back to the checkpoint $C_{i,x}$ determined by the process.

19. The method of claim 18 wherein said dependency information comprises a transitive dependency vector.

20. The method of claim 18 wherein at least one of said locally determined checkpoints is a volatile checkpoint.

21. The method of claim 18 wherein at least one of said locally determined checkpoints is a non-volatile checkpoint.

22. The method of claim 18 wherein said action request is received from a central monitoring process.

23. The method of claim 18 wherein said action request includes an identification of said target set of local checkpoints.

24. A method for operation of a computer system, executing a plurality of processes, $P_i$, where i is the process identification, and for recovering from an error in said system, each of said processes capable of inter-process communication, and each of said processes capable of performing periodic local checkpoints, where $C_{i,x}$ represents the xth checkpoint of process $P_i$, and wherein said inter-process communication and periodic local checkpoints define a checkpoint and communication pattern, the method comprising the steps of:

each of said processes locally maintaining dependency information, said dependency information representing said checkpoint and communication pattern;

defining a target set of local checkpoints, each from a different process;

upon receipt of an action request, each of said processes $P_i$ locally determining a checkpoint $C_{i,x}$ using said locally maintained dependency information, wherein $C_{i,x}$ is a checkpoint in a minimum consistent global checkpoint including said target set of checkpoints; and each of said processes $P_i$ rolling back to the checkpoint $C_{i,x}$ determined by the process.

25. The method of claim 24 wherein said dependency information comprises a transitive dependency vector.

26. The method of claim 24 wherein said action request is received from a central monitoring process.

27. The method of claim 24 wherein said action request includes an identification of said target set of local checkpoints.

28. The method of claim 24 wherein at least one of said locally determined checkpoints is a volatile checkpoint.

29. The method of claim 24 wherein at least one of said locally determined checkpoints is a non-volatile checkpoint.

* * * * *